United States Patent
Sullivan et al.

(10) Patent No.: US 10,280,000 B2
(45) Date of Patent: *May 7, 2019

(54) SUSPENSION SYSTEM FOR AUTONOMOUS TRANSPORTS

(71) Applicant: SYMBOTIC, LLC, Wilmington, MA (US)

(72) Inventors: Robert Sullivan, Wilmington, MA (US); Stephen C. Toebes, Chelmsford, MA (US)

(73) Assignee: Symbotic, LLC, Wilmington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/144,516

(22) Filed: May 2, 2016

(65) Prior Publication Data
US 2016/0244261 A1 Aug. 25, 2016

Related U.S. Application Data

(63) Continuation of application No. 14/882,114, filed on Oct. 13, 2015, now Pat. No. 9,327,903, which is a
(Continued)

(51) Int. Cl.
*B65G 1/06* (2006.01)
*B65G 13/00* (2006.01)
(Continued)

(52) U.S. Cl.
CPC ........... *B65G 1/065* (2013.01); *B60G 17/005* (2013.01); *B60P 9/00* (2013.01); *B62D 53/00* (2013.01);
(Continued)

(58) Field of Classification Search
CPC ....... G05D 22/0216; G05D 2201/0216; B62D 53/021; B62D 53/00; B62D 52/02;
(Continued)

(56) References Cited

U.S. PATENT DOCUMENTS 1,845,962 A 2/1932 Dorr
1,887,667 A 11/1932 Wheeler
(Continued)

FOREIGN PATENT DOCUMENTS

CN 202321418 7/2012
DE 4104527 8/1992
(Continued)

OTHER PUBLICATIONS

International Search Report, International Application No. PCT/US2011/065243, dated Mar. 21, 2012.
(Continued)

*Primary Examiner* — Karen Beck
(74) *Attorney, Agent, or Firm* — Perman & Green, LLP

(57) ABSTRACT

An autonomous transport robot for transporting a payload, the autonomous transport robot including a drive section assembly having at least one motor and a pair of drive wheels coupled to the motor, a frame configured to support a payload, a transfer arm connected to the frame and configured for the autonomous transfer of payload to and from the frame, and a suspension system movably connecting the drive section assembly and the frame allowing relative movement between the frame and the drive section assembly.

12 Claims, 11 Drawing Sheets

Related U.S. Application Data continuation of application No. 14/576,644, filed on Dec. 19, 2014, now Pat. No. 9,156,394, which is a continuation of application No. 14/245,551, filed on Apr. 4, 2014, now Pat. No. 8,919,801, which is a continuation of application No. 13/326,505, filed on Dec. 15, 2011, now Pat. No. 8,696,010.

(60) Provisional application No. 61/423,317, filed on Dec. 15, 2010.

(51) Int. Cl.
| | |
|---|---|
| *B62D 53/02* | (2006.01) |
| *B65G 7/00* | (2006.01) |
| *B60P 9/00* | (2006.01) |
| *B62D 53/00* | (2006.01) |
| *B60G 17/005* | (2006.01) |
| *B65G 1/04* | (2006.01) |
| *B65G 1/137* | (2006.01) |
| *E02F 9/08* | (2006.01) |

(52) U.S. Cl.
CPC ......... *B62D 53/021* (2013.01); *B65G 1/0492* (2013.01); *B65G 7/00* (2013.01); *B65G 13/00* (2013.01); *B60G 2300/02* (2013.01); *B62D 53/02* (2013.01); *B65G 1/1373* (2013.01); *E02F 9/0841* (2013.01); *G05D 2201/0216* (2013.01); *Y10S 901/01* (2013.01); *Y10T 74/20636* (2015.01)

(58) Field of Classification Search
CPC .......... B65G 1/10; B65G 7/00; B65G 1/0492; B65G 1/1373; B65G 1/065; B65G 17/005; B65G 13/00; B60P 9/00; B60G 17/005; B60G 2300/02; Y10S 901/01; Y10T 74/20636; E02F 9/0841
USPC ............................................. 280/400, 6.153
See application file for complete search history.

(56) References Cited

U.S. PATENT DOCUMENTS

| | | | |
|---|---|---|---|
| 2,606,508 A | 8/1952 | van Nes | |
| 2,656,995 A | 10/1953 | Wolf | |
| 2,673,689 A | 3/1954 | Bonanno | |
| 2,792,234 A | 5/1957 | Page | |
| 2,840,248 A | 6/1958 | Grove et al. | |
| 2,877,575 A | 3/1959 | Stedt | |
| 2,923,421 A | 2/1960 | de Senigon de Roumefort | |
| 2,945,604 A | 7/1960 | Kroll | |
| 2,996,621 A | 8/1961 | Barrett, Jr. | |
| 3,161,303 A | 12/1964 | Burrows | |
| 3,162,459 A | 12/1964 | Marmorine et al. | |
| 3,269,744 A | 8/1966 | Dobson | |
| 3,369,648 A | 2/1968 | Wentz | |
| 3,370,492 A | 2/1968 | Treff | |
| 3,519,149 A | 7/1970 | Saul | |
| 3,554,390 A | 1/1971 | Saul | |
| 3,636,586 A | 1/1972 | Bollinger et al. | |
| 3,677,421 A | 7/1972 | Kintner | |
| 3,732,828 A | 5/1973 | Wanner | |
| 3,737,056 A | 6/1973 | Hathcock | |
| 3,738,506 A | 6/1973 | Cornford et al. | |
| 3,744,945 A | 7/1973 | Metrailer | |
| 3,746,189 A | 7/1973 | Burch et al. | |
| 3,751,758 A | 8/1973 | Higbee et al. | |
| 3,774,543 A | 11/1973 | Welsh | |
| 3,782,565 A | 1/1974 | Doran et al. | |
| 3,789,765 A | 2/1974 | Schultz | |
| 3,802,580 A | 4/1974 | Castaldi | |
| 3,811,383 A | 5/1974 | Butzow | |
| 3,822,647 A | 7/1974 | Hill et al. | |
| 3,850,111 A | 11/1974 | Hansen | |
| 3,876,087 A | 4/1975 | Osta | |
| 3,876,095 A | 4/1975 | Stedt | |
| 3,896,955 A | 7/1975 | Collins et al. | |
| 3,904,216 A | 9/1975 | Metrailer | |
| 3,940,105 A | 2/1976 | Metrailer | |
| 3,970,840 A | 7/1976 | De Bruine | |
| 3,976,302 A | 8/1976 | Hammarstrand | |
| 3,984,012 A | 10/1976 | Ennis et al. | |
| 4,007,843 A | 2/1977 | Lubbers et al. | |
| 4,026,365 A | 5/1977 | Andersson et al. | |
| 4,037,291 A | 7/1977 | Huempfner et al. | |
| 4,057,019 A | 11/1977 | Shaffer | |
| 4,064,986 A | 12/1977 | Bertovich | |
| 4,072,203 A | 2/1978 | Pierson | |
| 4,079,955 A | 3/1978 | Thorpe et al. | |
| 4,087,116 A | 5/1978 | Morimoto | |
| 4,174,854 A | 11/1979 | Spicka et al. | |
| 4,183,304 A | 1/1980 | Forster | |
| 4,213,396 A | 7/1980 | Mehren et al. | |
| 4,214,535 A | 7/1980 | Gerhard | |
| 4,219,296 A | 8/1980 | Fujii et al. | |
| 4,223,611 A * | 9/1980 | Dawson .............. | B62D 1/26 104/119 |
| 4,265,582 A | 5/1981 | Theobald | |
| 4,271,764 A | 6/1981 | Braun et al. | |
| 4,273,234 A | 6/1981 | Bourgeois | |
| 4,307,988 A | 12/1981 | Page et al. | |
| 4,346,659 A | 8/1982 | Binder | |
| 4,349,937 A | 9/1982 | Fontana | |
| 4,349,938 A | 9/1982 | Fontana | |
| 4,353,572 A | 10/1982 | McCain | |
| 4,372,219 A | 2/1983 | Gibbs | |
| 4,372,724 A | 2/1983 | Stolzer | |
| 4,394,104 A | 7/1983 | Camerini et al. | |
| 4,395,181 A | 7/1983 | Loomer | |
| 4,406,570 A | 9/1983 | Duncan et al. | |
| 4,428,708 A | 1/1984 | Burt | |
| 4,445,440 A | 5/1984 | Geiss | |
| 4,459,078 A | 7/1984 | Chiantella et al. | |
| 4,470,742 A | 9/1984 | Schindler | |
| 4,492,504 A | 1/1985 | Hainsworth | |
| 4,505,630 A | 3/1985 | Kaschner et al. | |
| 4,527,486 A * | 7/1985 | Baird ................... | E21F 13/006 105/215.2 |
| 4,538,950 A | 9/1985 | Shiomi et al. | |
| 4,678,390 A | 7/1987 | Bonneton et al. | |
| 4,679,149 A | 7/1987 | Merz | |
| 4,715,662 A | 12/1987 | van Zanten et al. | |
| 4,716,530 A | 12/1987 | Ogawa et al. | |
| 4,726,725 A | 2/1988 | Baker et al. | |
| 4,733,740 A | 3/1988 | Bigowsky et al. | |
| 4,750,429 A * | 6/1988 | Mordaunt ............ | B66C 19/002 104/48 |
| 4,773,807 A | 9/1988 | Kroll et al. | |
| 4,786,229 A | 11/1988 | Henderson | |
| 4,811,229 A | 3/1989 | Wilson | |
| 4,812,985 A | 3/1989 | Hambrick et al. | |
| 4,856,956 A | 8/1989 | Zur | |
| 4,862,807 A | 9/1989 | Guadagno | |
| 4,878,876 A | 11/1989 | Ishimoto | |
| 4,883,401 A | 11/1989 | Kavieff | |
| 4,887,016 A | 12/1989 | Malick | |
| 4,905,783 A | 3/1990 | Bober | |
| 4,909,697 A | 3/1990 | Bernard, II et al. | |
| 4,936,738 A | 6/1990 | Brennan et al. | |
| 4,942,826 A | 7/1990 | Erickson | |
| 4,966,242 A | 10/1990 | Baillargeon | |
| 4,966,513 A | 10/1990 | Motoda | |
| 4,993,905 A | 2/1991 | Potocnjak | |
| 5,002,449 A | 3/1991 | Kita et al. | |
| 5,004,399 A | 4/1991 | Sullivan et al. | |
| 5,015,145 A | 5/1991 | Angell et al. | |
| 5,069,592 A | 12/1991 | Galperin | |
| 5,096,355 A | 3/1992 | Schroder | |
| 5,134,353 A | 7/1992 | Kita et al. | |
| 5,134,940 A | 8/1992 | Fujita et al. | |
| 5,135,344 A | 8/1992 | Kita et al. | |
| 5,140,787 A | 8/1992 | Corcoran | |

(56) References Cited

U.S. PATENT DOCUMENTS

| | | | |
|---|---|---|---|
| 5,149,654 A | 9/1992 | Gross et al. | |
| 5,156,639 A | 10/1992 | Bostrom | |
| 5,163,001 A * | 11/1992 | Luke, Jr. | G05B 19/41895 |
| | | | 180/169 |
| 5,165,838 A * | 11/1992 | Kallansrude | B60G 17/0152 |
| | | | 198/782 |
| 5,168,815 A | 12/1992 | Comer et al. | |
| 5,179,329 A | 1/1993 | Nishikawa et al. | |
| 5,187,664 A | 2/1993 | Yardley et al. | |
| 5,199,840 A | 4/1993 | Castaldi et al. | |
| 5,213,463 A | 5/1993 | Rothlisberger et al. | |
| 5,218,909 A | 6/1993 | Ng | |
| 5,219,264 A | 6/1993 | McClure et al. | |
| 5,226,782 A | 7/1993 | Rigling | |
| 5,238,100 A | 8/1993 | Rose, Jr. et al. | |
| 5,265,944 A | 11/1993 | Gloceri | |
| 5,271,703 A | 12/1993 | Lindqvist et al. | |
| 5,273,392 A | 12/1993 | Bernard et al. | |
| 5,281,901 A | 1/1994 | Yardley et al. | |
| 5,286,157 A | 2/1994 | Vainio et al. | |
| 5,307,888 A | 5/1994 | Urvoy | |
| 5,327,354 A | 7/1994 | Tsujimoto | |
| 5,328,316 A | 7/1994 | Hoffmann | |
| 5,333,982 A | 8/1994 | Tanizawa et al. | |
| 5,333,983 A | 8/1994 | Hatouchi et al. | |
| 5,337,880 A | 8/1994 | Claycomb et al. | |
| 5,362,197 A | 11/1994 | Rigling | |
| 5,370,492 A | 12/1994 | Gleyze et al. | |
| 5,377,851 A | 1/1995 | Asano et al. | |
| 5,377,910 A | 1/1995 | Newton et al. | |
| 5,379,229 A | 1/1995 | Parsons et al. | |
| 5,380,139 A | 1/1995 | Pohjonen et al. | |
| 5,388,955 A | 2/1995 | Schroder | |
| 5,397,212 A | 3/1995 | Watanabe et al. | |
| 5,403,147 A | 4/1995 | Tanaka | |
| 5,405,232 A | 4/1995 | Lloyd et al. | |
| 5,410,969 A | 5/1995 | Rene et al. | |
| 5,418,732 A | 5/1995 | McFadin | |
| 5,421,265 A | 6/1995 | Suigmoto et al. | |
| 5,421,685 A | 6/1995 | Elmer et al. | |
| 5,421,697 A | 6/1995 | Ostwald | |
| 5,425,612 A | 6/1995 | Ebstein | |
| 5,434,490 A | 7/1995 | Ishida et al. | |
| 5,445,485 A | 8/1995 | Poulet | |
| 5,450,797 A | 9/1995 | Becker et al. | |
| 5,460,476 A | 10/1995 | Gazza | |
| 5,472,309 A | 12/1995 | Bernard, II et al. | |
| 5,501,295 A | 3/1996 | Muller et al. | |
| 5,525,884 A * | 6/1996 | Sugiura | G05D 1/0261 |
| | | | 180/168 |
| 5,529,165 A | 6/1996 | Shupert | |
| 5,548,516 A | 8/1996 | Gudat et al. | |
| 5,564,880 A | 10/1996 | Lederer | |
| 5,588,796 A | 12/1996 | Ricco et al. | |
| 5,601,395 A | 2/1997 | Lichti, Sr. et al. | |
| 5,611,422 A | 3/1997 | Harkonen | |
| 5,615,992 A | 4/1997 | Proske et al. | |
| 5,626,362 A | 5/1997 | Mottola | |
| 5,632,350 A | 5/1997 | Gauvin | |
| 5,650,703 A | 7/1997 | Yardley et al. | |
| 5,664,688 A | 9/1997 | Kitanaka et al. | |
| 5,667,230 A | 9/1997 | Riley et al. | |
| 5,668,724 A | 9/1997 | Ehret et al. | |
| 5,707,199 A | 1/1998 | Faller | |
| 5,718,322 A | 2/1998 | Mulhern | |
| 5,718,551 A | 2/1998 | Ebstein | |
| 5,725,063 A | 3/1998 | Ceragioli et al. | |
| 5,743,562 A | 4/1998 | Mottola | |
| 5,764,014 A | 6/1998 | Jakeway et al. | |
| 5,801,506 A | 9/1998 | Netzler | |
| 5,802,980 A | 9/1998 | Hofmiller | |
| 5,806,870 A | 9/1998 | Hull et al. | |
| 5,810,540 A | 9/1998 | Castaldi | |
| 5,829,096 A | 11/1998 | Perry | |
| 5,833,431 A | 11/1998 | Rosse, III et al. | |
| 5,839,872 A | 11/1998 | Goto et al. | |
| 5,847,537 A | 12/1998 | Parmley, Sr. | |
| 5,857,413 A | 1/1999 | Ward | |
| 5,866,469 A | 2/1999 | Hays | |
| 5,918,951 A | 7/1999 | Rudd, III | |
| 5,927,926 A | 7/1999 | Yagi et al. | |
| 5,928,058 A | 7/1999 | Francis et al. | |
| 5,988,306 A | 11/1999 | Ooishi | |
| 6,000,502 A | 12/1999 | Leasor et al. | |
| 6,021,367 A | 2/2000 | Pilutti et al. | |
| 6,024,381 A | 2/2000 | Mottola | |
| 6,036,427 A | 3/2000 | Kita et al. | |
| 6,038,501 A | 3/2000 | Kawakami | |
| 6,061,607 A | 5/2000 | Bradley et al. | |
| 6,062,942 A | 5/2000 | Ogihara | |
| 6,116,842 A | 9/2000 | Harris et al. | |
| 6,149,366 A | 11/2000 | Deandrea | |
| 6,158,566 A | 12/2000 | Pollock | |
| 6,220,676 B1 | 4/2001 | Rudd, III | |
| 6,257,597 B1 * | 7/2001 | Galazin | B60G 9/003 |
| | | | 280/124.116 |
| 6,272,406 B2 | 8/2001 | Alofs et al. | |
| 6,324,994 B1 | 12/2001 | Glenn | |
| 6,325,586 B1 | 12/2001 | Loy | |
| 6,341,269 B1 | 1/2002 | Dulaney et al. | |
| 6,345,217 B1 | 2/2002 | Zeitler et al. | |
| 6,352,035 B1 | 3/2002 | Kashiwase et al. | |
| 6,354,430 B1 | 3/2002 | Oe | |
| 6,360,673 B1 | 3/2002 | Herrin et al. | |
| 6,389,981 B1 | 5/2002 | Strothmann et al. | |
| 6,390,756 B1 | 5/2002 | Isaacs et al. | |
| 6,391,226 B1 | 5/2002 | Chauvette et al. | |
| 6,425,723 B1 | 7/2002 | Okada et al. | |
| 6,439,131 B1 | 8/2002 | Higgins | |
| 6,439,955 B1 | 8/2002 | Feketo | |
| 6,503,043 B1 | 1/2003 | Smith et al. | |
| 6,508,102 B1 | 1/2003 | Margolis et al. | |
| 6,563,128 B2 | 5/2003 | Lublin et al. | |
| 6,600,418 B2 | 7/2003 | Francis et al. | |
| 6,601,435 B2 | 8/2003 | Hong | |
| 6,629,502 B2 | 10/2003 | Matsukawa | |
| 6,631,321 B1 | 10/2003 | Ciprian | |
| 6,645,355 B2 | 11/2003 | Hanson et al. | |
| 6,652,213 B1 | 11/2003 | Mitchell et al. | |
| 6,655,297 B2 | 12/2003 | Kawato et al. | |
| 6,692,211 B2 | 2/2004 | Yuyama et al. | |
| 6,695,328 B2 | 2/2004 | Cope | |
| 6,721,638 B2 | 4/2004 | Zeitler | |
| 6,748,292 B2 | 6/2004 | Mountz | |
| 6,763,767 B2 | 7/2004 | Jackson et al. | |
| 6,808,058 B2 | 10/2004 | Shiohara | |
| 6,851,921 B2 | 2/2005 | Haag | |
| 6,861,154 B2 | 3/2005 | Olson et al. | |
| 6,864,489 B2 | 3/2005 | Chen et al. | |
| 6,880,202 B2 | 4/2005 | Thompson et al. | |
| 6,928,336 B2 | 8/2005 | Peshkin et al. | |
| 6,929,440 B1 | 8/2005 | Grond | |
| 6,948,899 B2 | 9/2005 | Lee | |
| 6,950,722 B2 | 9/2005 | Mountz | |
| 6,988,451 B2 | 1/2006 | Marcotte et al. | |
| 6,997,665 B2 | 2/2006 | Bouche et al. | |
| 7,002,698 B2 | 2/2006 | Hanson et al. | |
| 7,002,772 B2 | 2/2006 | Yardy | |
| 7,003,375 B2 | 2/2006 | Inui | |
| 7,008,164 B2 | 3/2006 | Rokkaku | |
| 7,011,487 B2 | 3/2006 | Kafka et al. | |
| 7,017,228 B2 | 3/2006 | Silverstein et al. | |
| 7,025,191 B2 | 4/2006 | Lichti et al. | |
| 7,058,866 B2 | 6/2006 | Flanagan et al. | |
| 7,074,151 B2 | 7/2006 | Thompson | |
| 7,085,097 B2 | 8/2006 | Starr et al. | |
| 7,100,294 B1 | 9/2006 | Goldsobel et al. | |
| 7,101,139 B1 | 9/2006 | Benedict | |
| 7,102,848 B2 | 9/2006 | Kumpon et al. | |
| 7,110,855 B2 | 9/2006 | Leishman | |
| 7,119,982 B2 | 10/2006 | Starr et al. | |
| 7,128,196 B2 | 10/2006 | Oldford et al. | |
| 7,128,521 B2 | 10/2006 | Hansl | |
| 7,135,992 B2 | 11/2006 | Karlsson et al. | |

(56) References Cited

U.S. PATENT DOCUMENTS

| | | |
|---|---|---|
| 7,137,593 B2 | 11/2006 | Baatz |
| 7,145,478 B2 | 12/2006 | Goncalves et al. |
| 7,145,747 B2 | 12/2006 | Brace et al. |
| 7,155,308 B2 | 12/2006 | Jones |
| 7,184,855 B2 | 2/2007 | Stingel, III et al. |
| 7,192,034 B2 | 3/2007 | Radke et al. |
| 7,221,998 B2 | 5/2007 | Brust et al. |
| 7,266,422 B1 | 9/2007 | DeMotte et al. |
| 7,319,320 B2 | 1/2008 | Kawashima et al. |
| 7,329,081 B2 | 2/2008 | Baker et al. |
| 7,381,022 B1 | 6/2008 | King |
| 7,386,379 B2 | 6/2008 | Naik et al. |
| 7,402,018 B2 | 7/2008 | Mountz et al. |
| 7,426,970 B2 | 9/2008 | Olsen |
| 7,433,759 B2 | 10/2008 | Nangoy |
| 7,495,561 B2 | 2/2009 | Bodin et al. |
| 7,506,404 B2 | 3/2009 | Block et al. |
| 7,520,376 B2 | 4/2009 | Bar |
| 7,536,283 B2 | 5/2009 | Potter et al. |
| 7,539,557 B2 | 5/2009 | Yamauchi |
| 7,584,812 B2 | 9/2009 | Radke et al. |
| 7,587,260 B2 | 9/2009 | Bruemmer et al. |
| 7,591,630 B2 | 9/2009 | Lert, Jr. |
| 7,620,477 B2 | 11/2009 | Bruemmer |
| 7,636,982 B2 | 12/2009 | Jones et al. |
| 7,641,014 B2 | 1/2010 | Hu |
| 7,648,002 B2 | 1/2010 | Easton et al. |
| 7,661,920 B2 | 2/2010 | Kantola et al. |
| 7,668,621 B2 | 2/2010 | Bruemmer |
| 7,671,293 B2 | 3/2010 | Fry et al. |
| 7,682,122 B2 | 3/2010 | Maynard et al. |
| 7,686,560 B2 | 3/2010 | Laurin et al. |
| 7,689,318 B2 | 3/2010 | Draper |
| 7,695,235 B1 | 4/2010 | Rallis |
| 7,730,781 B2 | 6/2010 | Zhang et al. |
| 7,751,928 B1 | 7/2010 | Antony et al. |
| 7,769,513 B2 | 8/2010 | Breed et al. |
| 7,771,152 B2 | 8/2010 | Waltersbacher |
| 7,792,350 B2 | 9/2010 | Kiley |
| 7,793,742 B2 | 9/2010 | Donaldson et al. |
| 7,801,644 B2 | 9/2010 | Bruemmer et al. |
| 7,826,919 B2 | 11/2010 | D'Andrea et al. |
| 7,826,926 B2 | 11/2010 | Myeong et al. |
| 7,861,844 B2 | 1/2011 | Hayduchok et al. |
| 7,866,671 B2 | 1/2011 | Madler |
| 7,885,750 B2 | 2/2011 | Lu |
| 7,909,562 B2 | 3/2011 | Mead |
| 7,926,145 B2 | 4/2011 | Liao |
| 7,931,431 B2 | 4/2011 | Benedict et al. |
| 7,960,973 B2 | 6/2011 | Zeller et al. |
| 7,965,871 B2 | 6/2011 | Ihara |
| 7,967,354 B2 | 6/2011 | Faulkner et al. |
| 7,974,738 B2 | 7/2011 | Bruemmer et al. |
| 7,991,505 B2 | 8/2011 | Lert, Jr. et al. |
| 8,000,835 B2 | 8/2011 | Friz et al. |
| 8,001,837 B2 | 8/2011 | Larson et al. |
| 8,006,824 B2 | 8/2011 | Wada et al. |
| 8,007,221 B1 | 8/2011 | More et al. |
| 8,965,619 B2 | 2/2015 | Sullivan et al. |
| 10,052,764 B2* | 8/2018 | Chelian .................. B25J 9/1664 |
| 2002/0076307 A1 | 6/2002 | Fallin et al. |
| 2005/0047895 A1 | 3/2005 | Lert |
| 2005/0131645 A1* | 6/2005 | Panopoulos .......... B60P 1/5457 |
| | | 701/472 |
| 2005/0151360 A1* | 7/2005 | Bertrand ................ A61G 5/043 |
| | | 280/755 |
| 2005/0238455 A1 | 10/2005 | Toteff |
| 2005/0238465 A1 | 10/2005 | Ruazumov |
| 2006/0232025 A1* | 10/2006 | Braud ..................... B60G 9/02 |
| | | 280/5.508 |
| 2006/0245862 A1 | 11/2006 | Hansel et al. |
| 2007/0125727 A1 | 6/2007 | Winkler |
| 2007/0297879 A1 | 12/2007 | Yuyama et al. |
| 2009/0074545 A1 | 3/2009 | Lert, Jr. et al. |
| 2010/0043665 A1 | 2/2010 | Brigham |
| 2010/0131182 A1* | 5/2010 | Deegan .................. G01G 19/08 |
| | | 701/124 |
| 2010/0218697 A1 | 9/2010 | Sugimoto |
| 2010/0224427 A1 | 9/2010 | Nuchter et al. |
| 2010/0316468 A1* | 12/2010 | Lert ....................... B65G 1/045 |
| | | 414/273 |
| 2010/0316469 A1* | 12/2010 | Lert ....................... B65G 1/045 |
| | | 414/273 |
| 2012/0185122 A1* | 7/2012 | Sullivan ............... G05D 1/0272 |
| | | 701/23 |
| 2012/0189416 A1 | 7/2012 | Toebes et al. |
| 2012/0195724 A1* | 8/2012 | Toebes .................. B65G 13/00 |
| | | 414/509 |
| 2013/0061420 A1* | 3/2013 | Vanderstegen-Drake ................... |
| | | A47L 9/00 |
| | | 15/347 |
| 2014/0350725 A1* | 11/2014 | LaFary .................. G06N 3/008 |
| | | 700/253 |
| 2015/0102568 A1* | 4/2015 | Slawson .............. B60G 17/005 |
| | | 280/5.514 |
| 2015/0150429 A1* | 6/2015 | Yoo ...................... A47L 11/4011 |
| | | 173/1 |
| 2015/0314446 A1* | 11/2015 | Day ..................... B23Q 9/0007 |
| | | 701/23 |
| 2015/0336741 A1 | 11/2015 | Ahammer et al. |
| 2016/0000282 A1* | 1/2016 | Vanderstegen-Drake ................... |
| | | A47L 9/009 |
| | | 280/6.157 |
| 2016/0121486 A1* | 5/2016 | Lipinski ............... B05B 13/005 |
| | | 427/427.3 |
| 2017/0083020 A1* | 3/2017 | Purwin .................... B25J 5/007 |
| 2017/0320522 A1* | 11/2017 | Lorenz .................... B60G 3/18 |

FOREIGN PATENT DOCUMENTS

| | | |
|---|---|---|
| DE | 20011661 | 12/2000 |
| DE | 10142395 | 11/2002 |
| DE | 102011012950 | 9/2012 |
| EP | 0466004 | 1/1992 |
| EP | 0499276 | 8/1992 |
| EP | 0647575 | 4/1995 |
| EP | 0737630 | 10/1996 |
| EP | 1193195 | 4/2002 |
| EP | 1598291 | 11/2005 |
| EP | 1627830 | 2/2006 |
| EP | 1775240 | 4/2007 |
| EP | 2039580 | 3/2009 |
| FR | 2730715 | 8/1996 |
| JP | 49131671 | 8/1973 |
| JP | 5310055 | 3/1978 |
| JP | 5931297 | 2/1984 |
| JP | 62041705 | 2/1987 |
| JP | 6337007 | 2/1988 |
| JP | 061309 | 1/1994 |
| JP | 07157013 | 6/1995 |
| JP | 081553 | 1/1996 |
| JP | 08113321 | 5/1996 |
| JP | 08258763 | 10/1996 |
| JP | 0948507 | 2/1997 |
| JP | 11124298 | 5/1999 |
| JP | 11180697 | 7/1999 |
| JP | 2001344020 | 12/2001 |
| JP | 2002356207 | 12/2001 |
| JP | 2003321102 | 11/2003 |
| JP | 3102245 | 7/2004 |
| JP | 2005206259 | 8/2005 |
| JP | 2006160523 | 6/2006 |
| JP | 3867866 | 1/2007 |
| JP | 2008023639 | 2/2008 |
| JP | 2008100825 | 5/2008 |
| JP | 60153309 | 8/2009 |
| JP | 2010158942 | 7/2010 |
| JP | 2012071929 | 4/2012 |
| JP | 2007131383 | 5/2017 |
| TW | 588712 | 5/2004 |
| TW | 201022108 | 6/2010 |
| WO | 8501493 | 4/1985 |
| WO | 9534491 | 12/1995 |

(56) References Cited

FOREIGN PATENT DOCUMENTS

| WO | 0187648 | 11/2001 | | |
|----|---------|---------|---|---|
| WO | 2005009324 | 2/2005 | | |
| WO | 2005056943 | 6/2005 | | |
| WO | 2006095047 | 9/2006 | | |
| WO | 2007011814 | 1/2007 | | |
| WO | 2008152245 | 12/2008 | | |
| WO | 2009098573 | 8/2009 | | |
| WO | 2009106988 | 9/2009 | | |
| WO | 2010080539 | 7/2010 | | |
| WO | 2010118412 | 10/2010 | | |
| WO | WO-2016118955 A1 * | 7/2016 | ........... | B65G 1/1373 |

OTHER PUBLICATIONS

European Search Report, European Application No. 11190634, dated Mar. 31, 2016.

* cited by examiner

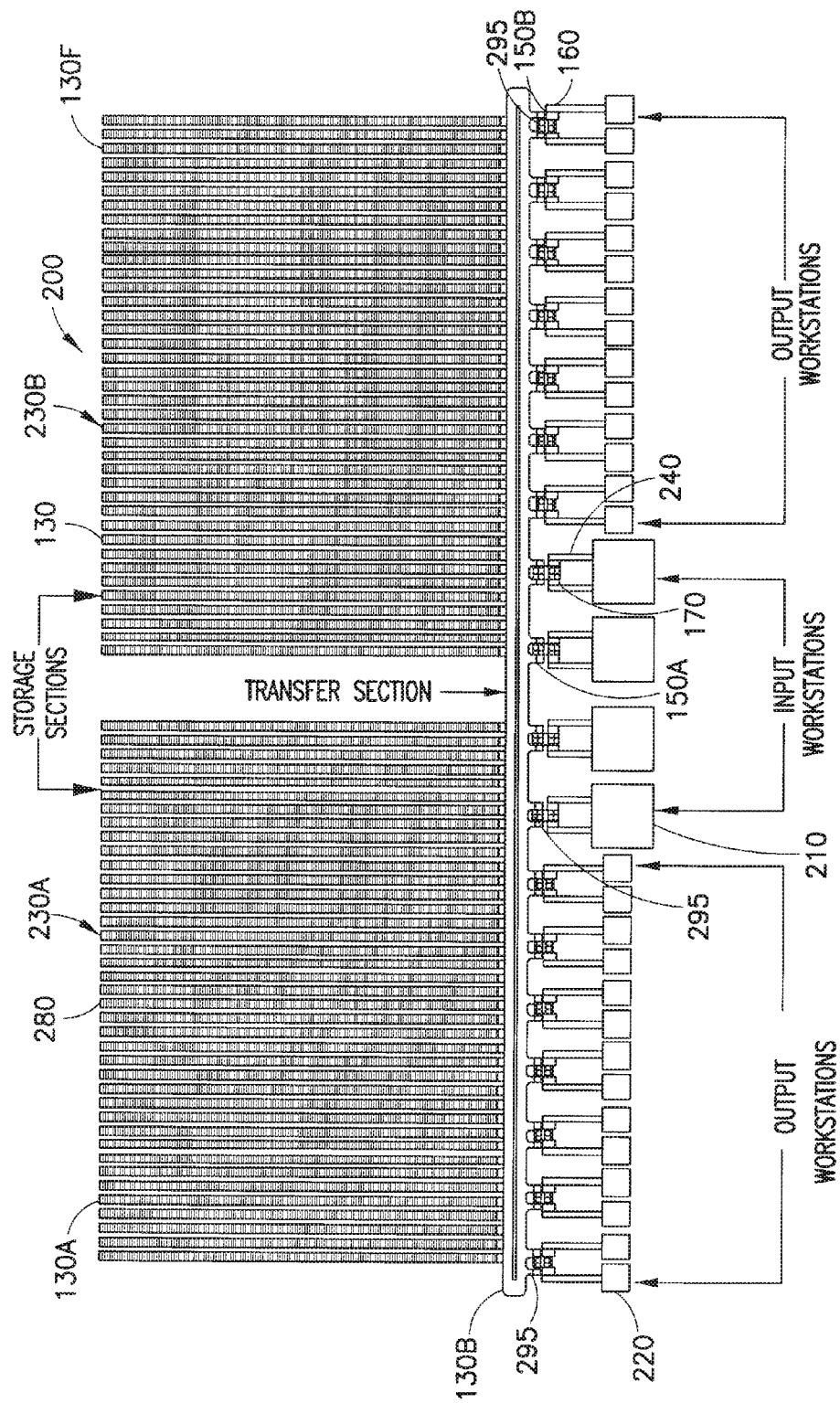

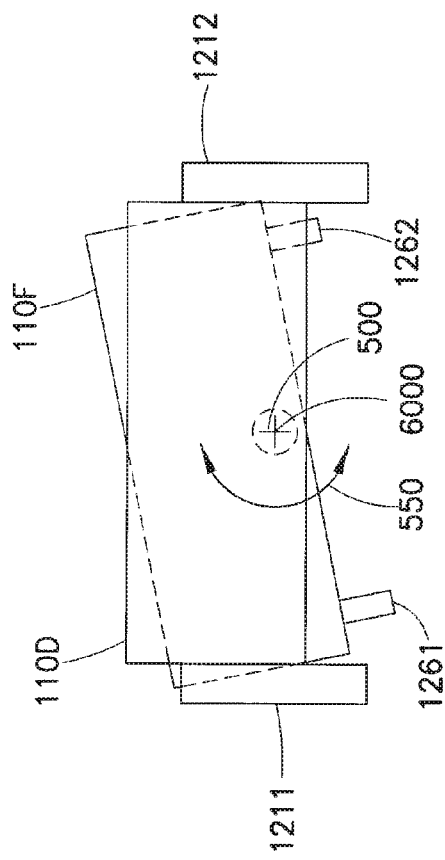
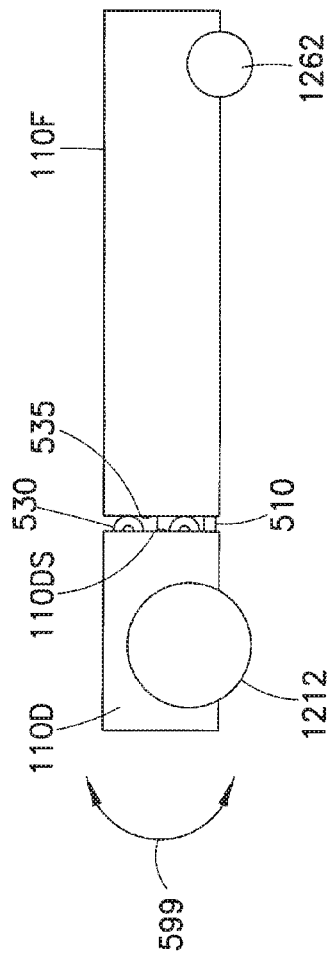

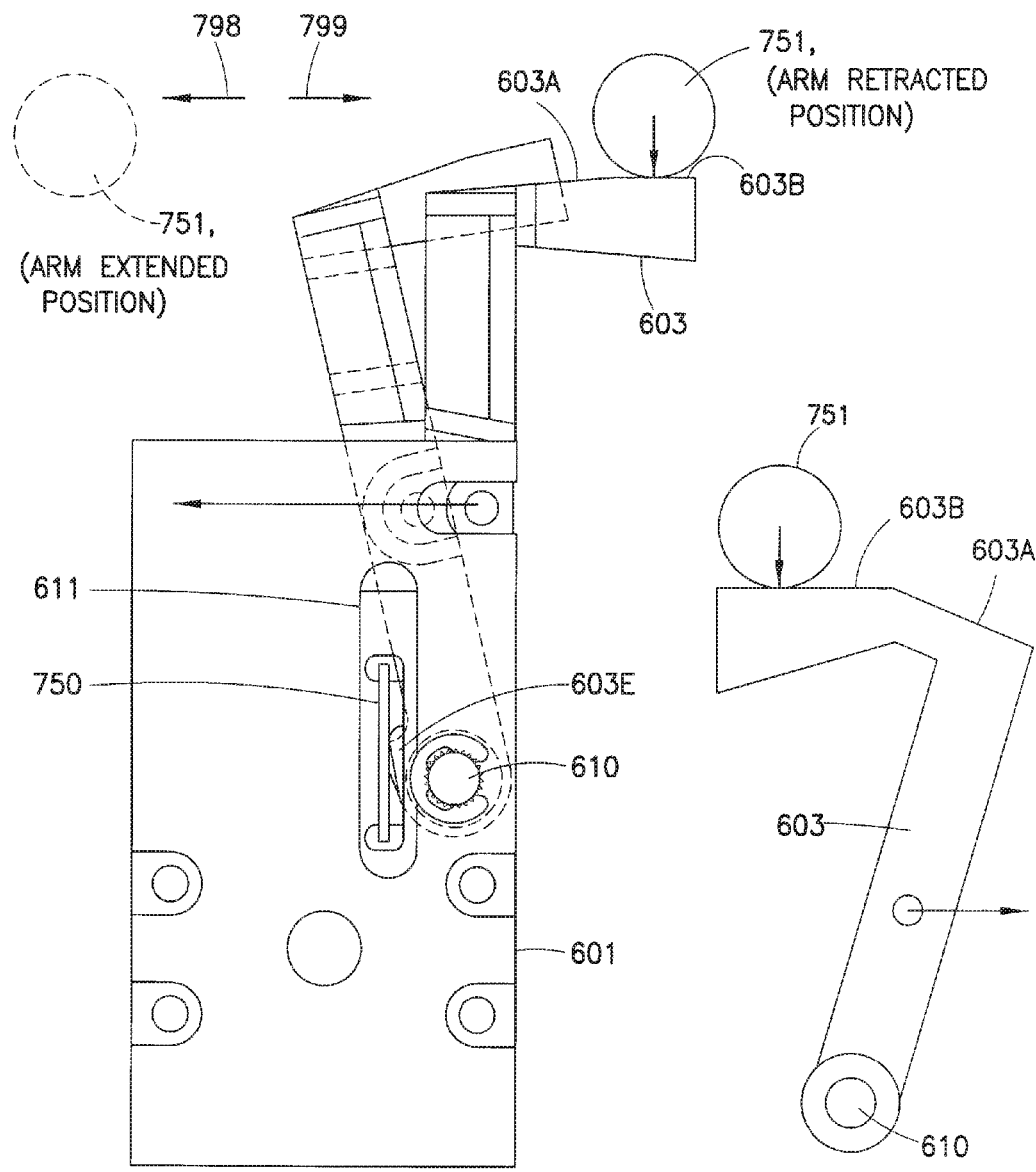

SUSPENSION SYSTEM FOR AUTONOMOUS
TRANSPORTS

CROSS REFERENCE TO RELATED
APPLICATIONS

This application is a continuation of U.S. patent application Ser. No. 14/882,114 filed on Oct. 13, 2015 (now U.S. Pat. No. 9,327,903) which is a continuation of U.S. patent application Ser. No. 14/576,644 filed on Dec. 19, 2014 (now U.S. Pat. No. 9,156,394) which is a continuation of U.S. patent application Ser. No. 14/245,551 filed on Apr. 4, 2014 (now U.S. Pat. No. 8,919,801) which is a continuation of U.S. patent application Ser. No. 13/326,505 filed on Dec. 15, 2011 (now U.S. Pat. No. 8,696,010) which is a non-provisional of and claims the benefit of U.S. Provisional Application Ser. No. 61/423,317 filed on Dec. 15, 2010, the disclosures of which are incorporated by reference herein in their entireties.

BACKGROUND

1. Field

The embodiments generally relate to storage and retrieval systems and, more particularly, to autonomous transports of the storage and retrieval systems.

2. Brief Description of Related Developments

Warehouses for storing case units may generally comprise a series of storage racks that are accessible by transport devices such as, for example, fork lifts, carts and elevators that are movable within aisles between or along the storage racks or by other lifting and transporting devices. These transport devices may be automated or manually driven. Generally the surfaces over which the transport devices operate may have uneven surfaces.

When transporting the cases to and from the storage racks with automated transports it would be advantageous to keep the wheels of the automated transports in substantial contact with the surfaces of the travel decks.

BRIEF DESCRIPTION OF THE DRAWINGS

The foregoing aspects and other features of the disclosed embodiments are explained in the following description, taken in connection with the accompanying drawings, wherein:

FIG. 2 illustrates a schematic plan view of an exemplary storage and retrieval system in accordance with the embodiments;

FIGS. 5A and 5B are schematic illustrations of the autonomous transport vehicle of FIG. 3 in accordance with the embodiments;

FIGS. 6A, 6B, 6C and 6D are schematic illustrations of a portion of the autonomous transport vehicle of FIG. 3 in accordance with the embodiments.

DETAILED DESCRIPTION OF THE
EXEMPLARY EMBODIMENT(S)

Figure 1:
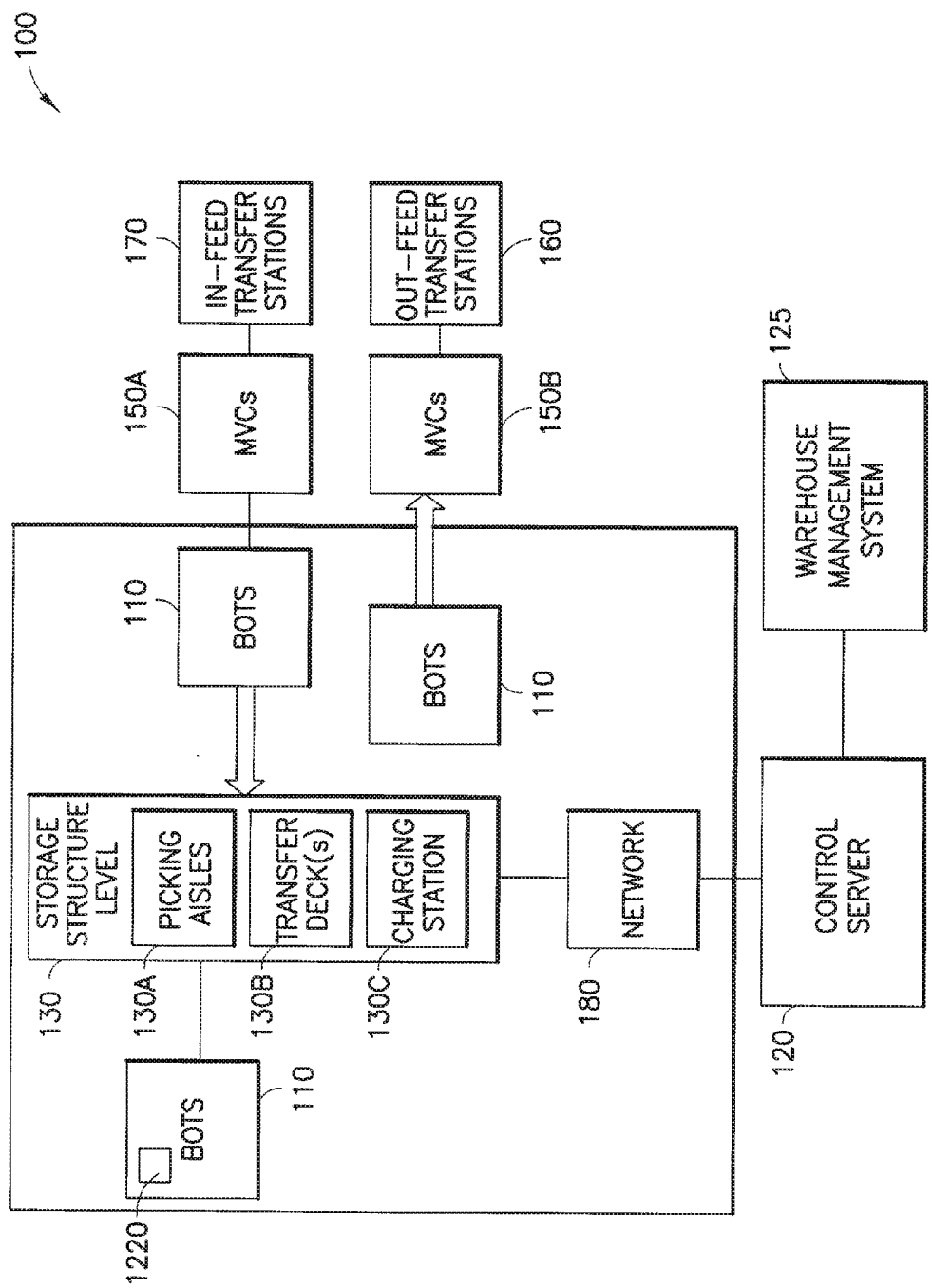
FIG. 1 schematically illustrates an exemplary storage and retrieval system in accordance with the embodiments.

FIG. 1 schematically illustrates an exemplary storage and retrieval system in accordance with the embodiments. Although the disclosed embodiments will be described with reference to the embodiments shown in the drawings, it should be understood that the disclosed embodiments can be embodied in many alternate forms. In addition, any suitable size, shape or type of elements or materials could be used.

In accordance with the embodiments the storage and retrieval system 100 may operate in a retail distribution center or warehouse to, for example, fulfill orders received from retail stores for case units (where case units as used herein means items not stored in trays, on totes or on pallets, e.g. uncontained or items stored in trays, totes or on pallets). It is noted that the case units may include cases of items (e.g. case of soup cans, boxes of cereal, etc.) or individual items that are adapted to be taken off of or placed on a pallet. In accordance with the embodiments, shipping cases or case units (e.g. cartons, barrels, boxes, crates, jugs, totes, pallets or any other suitable device for holding case units) may have variable sizes and may be used to hold items in shipping and may be configured so they are capable of being palletized for shipping. It is noted that when, for example, bundles or pallets of case units arrive at the storage and retrieval system the content of each pallet may be uniform (e.g. each pallet holds a predetermined number of the same item—one pallet holds soup and another pallet holds cereal) and as pallets leave the storage and retrieval system the pallets may contain any suitable number and combination of different items (e.g. each pallet may hold different types of items—a pallet holds a combination of soup and cereal). In the embodiments the storage and retrieval system described herein may be applied to any environment in which case units are stored and retrieved.

The storage and retrieval system 100 may be configured for installation in, for example, existing warehouse structures or adapted to new warehouse structures. In the embodiments, the storage and retrieval system may include in-feed and out-feed transfer stations 170, 160, multilevel vertical conveyors 150A, 150B, a storage structure 130, and a number of autonomous transport vehicles or robots 110 (referred to herein as "bots"). In the embodiments the storage and retrieval system may also include robot or bot transfer stations (as described in, for example, U.S. patent application Ser. No. 12/757,220, entitled "STORAGE AND RETRIEVAL SYSTEM," the disclosure of which is incorporated by reference herein in its entirety) that may provide an indirect interface between the bots 110 and the multilevel vertical conveyor 150A, 150B. The in-feed transfer stations 170 and out-feed transfer stations 160 may operate together with their respective multilevel vertical conveyors 150A, 150B for bi-directionally transferring case units to and from one or more levels of the storage structure 130. In the embodiments the multilevel vertical conveyors 150A, 150B may be dedicated inbound or in-feed conveyors 150A and outbound or out-feed conveyors 150B, or each of the conveyors 150A, 150B may be used for both inbound and outbound transfer of case units/items from the storage and retrieval system. The multilevel vertical conveyors may be any suitable lifting devices for transporting case units between levels of the storage and retrieval system. It is noted that while multilevel vertical conveyors are described herein in other aspects the conveyors may be any suitable conveyors or transfer/picking devices having any suitable transport path orientation. Some non-limiting suitable examples of a multilevel vertical conveyor can be found in, for example, U.S. patent application Ser. No. 13/327,088 entitled "MULTILEVEL VERTICAL CONVEYOR PLATFORM GUIDES" filed on Dec. 15, 2011, U.S. patent application Ser. No. 12/757,354, entitled "LIFT INTERFACE FOR STORAGE AND RETRIEVAL SYSTEMS," (the disclosure of which is incorporated by reference herein in its entirety) and U.S. patent application Ser. No. 12/757,220, entitled "STORAGE AND RETRIEVAL SYSTEM," (previously incorporated by reference). For example, the multilevel vertical conveyors may have any suitable number of support shelves for transporting the case units to a predetermined level of the storage and retrieval system. The support shelves may have slatted supports configured to allow fingers of the bots 110 or in-feed/out-feed transfer stations 170, 160 to pass between the slats for transferring case units to and from the conveyor. In alternate embodiments transfer of case units between the bots and the multilevel vertical conveyors may occur in any suitable manner.

As may be realized, the storage and retrieval system 100 may include multiple in-feed and out-feed multilevel vertical conveyors 150A, 150B that are accessible by, for example, bots 110 on each level of the storage and retrieval system 100 so that one or more case unit(s) can be transferred from a multilevel vertical conveyor 150A, 150B to each storage space on a respective level and from each storage space to any one of the multilevel vertical conveyors 150A, 150B on a respective level. The bots 110 may be configured to transfer the case units between the storage spaces and the multilevel vertical conveyors with one pick (e.g. substantially directly between the storage spaces and the multilevel vertical conveyors). By way of further example, the designated bot 110 picks the case unit(s) from a shelf of a multilevel vertical conveyor, transports the case unit(s) to a predetermined storage area of the storage structure 130 and places the case unit(s) in the predetermined storage area (and vice versa).

The bots 110 may be configured to place case units, such as the above described retail merchandise, into picking stock in the one or more levels of the storage structure 130 and then selectively retrieve ordered items for shipping the ordered items to, for example, a store or other suitable location. In one exemplary embodiment, the bots 110 may interface in any suitable manner with the multilevel vertical conveyors 150A, 150B such as through, for example, extension of a transfer arm or effector of the bot relative to a frame of the bot. Suitable examples of bots are described in U.S. patent application Ser. No. 12/757,312, entitled "AUTONOMOUS TRANSPORTS FOR STORAGE AND RETRIEVAL SYSTEMS" and filed on Apr. 9, 2010, United States Provisional Patent Application entitled "AUTOMATED BOT WITH TRANSFER ARM" with (Ser. No. 61/423,365) and filed on Dec. 15, 2010 (now U.S. patent application Ser. No. 13/326,952 filed Dec. 15, 2011), United States Provisional Patent Application entitled "AUTOMATED BOT TRANSFER ARM DRIVE SYSTEM" with (Ser. No. 61/423,388) and filed on Dec. 15, 2010 (now U.S. patent application Ser. No. 13/326,993 filed Dec. 15, 2011), United States Provisional Patent Application entitled "BOT HAVING HIGH SPEED STABILITY" with (Ser. No. 61/423,359) and filed on Dec. 15, 2010 (now U.S. patent application Ser. No. 13/326,447 filed Dec. 15, 2011), and United States Provisional Patent Application entitled "BOT SENSING POSITION" with (Ser. No. 61/423,206) and filed on Dec. 15, 2010 (now U.S. patent application Ser. No. 13/327,035 filed Dec. 15, 2011), the disclosures of which are incorporated by reference herein in their entireties.

The storage structure 130 may include multiple levels of storage rack modules where each level includes an array of storage spaces (arrayed on the multiple levels and in multiple rows on each level), picking aisles 130A formed between the rows of storage spaces, and transfer decks 130B. In the embodiments, each level may also include respective bot transfer stations for providing an indirect interface between the bots and the multilevel vertical conveyors. The picking aisles 130A and transfer decks 130B may be arranged for allowing the bots 110 to traverse respective levels of the storage structure 130 for placing case units into picking stock and to retrieve the ordered case units. As may be realized, the storage and retrieval system may be configured to allow random accessibility to the storage spaces. For example, all storage spaces in the storage structure 130 may be treated substantially equally when determining which storage spaces are to be used when picking and placing case units from/to the storage structure 130 such that any storage space of sufficient size can be used to store items. The storage structure 130 of the exemplary embodiments may also be arranged such that there is no vertical or horizontal array partitioning of the storage structure. For example, each multilevel vertical conveyor 150A, 150B is common to all storage spaces (e.g. the array of storage spaces) in the storage structure 130 such that any bot 110 can access each storage space and any multilevel vertical conveyor 150A, 150B can receive case units from any storage space on any level so that the multiple levels in the array of storage spaces substantially act as a single level (e.g. no vertical partitioning). The multilevel vertical conveyors 150A, 150B can also receive case units from any storage space on any level of the storage structure 130 (e.g. no horizontal partitioning). In the embodiments the storage and retrieval system may also be configured so that each multilevel vertical conveyor serves a predetermined area of the array of storage spaces.

The storage structure 130 may also include charging stations 130C for replenishing, for example, a battery pack of the bots 110. In the embodiments, the charging stations 130C may be located at, for example, transfer areas 295 (FIG. 2) of the transfer deck 130B so that the bots 110 can substantially simultaneously transfer items, for example, to and from a multilevel vertical conveyor 150A, 150B while being charged as described in United States Provisional Patent Application entitled "AUTONOMOUS TRANSPORT VEHICLE CHARGING SYSTEM" with (Ser. No. 61/423,402) and filed on Dec. 15, 2010 (now U.S. patent application Ser. No. 13/326,823 filed Dec. 15, 2011), the disclosures of which are incorporated by reference herein in their entireties. The bots 110 and other suitable features of the storage and retrieval system 100 may be controlled by, for example, one or more central system control computers (e.g. control server) 120 through, for example, any suitable network 180. The network 180 may be a wired network, a wireless network or a combination of a wireless and wired network using any suitable type and/or number of communication protocols. It is noted that, in one exemplary embodiment, the system control server 120 may be configured to manage and coordinate the overall operation of the storage and retrieval system 100 and interface with, for example, a warehouse management system 125, which in turn manages the warehouse facility as a whole. The control server 120 may be substantially similar to that described in, for example, U.S. patent application Ser. No. 12/757,337, entitled "CONTROL SYSTEM FOR STORAGE AND RETRIEVAL SYSTEMS," the disclosure of which is incorporated by reference herein in its entirety.

Referring also to FIG. 2, an exemplary configuration of the storage and retrieval system 100 is shown. Other suitable exemplary configurations of storage and retrieval systems can be found in, for example, U.S. patent application Ser. No. 12/757,381, entitled "STORAGE AND RETRIEVAL SYSTEM" and filed on Apr. 9, 2010, and United States Provisional Patent Application entitled "WAREHOUSING SCALABLE STORAGE STRUCTURE" with (Ser. No. 61/423,340) and filed on Dec. 15, 2010 (now U.S. patent application Ser. No. 13/326,674 filed Dec. 15, 2011), the disclosures of which are incorporated by reference herein in their entireties. It should be understood that in the embodiments the storage and retrieval system may have any suitable configuration. As can be seen in FIG. 2, the storage and retrieval system 200 is configured, for exemplary purposes only, as a single-ended picking structure in which only one side of the system 200 has a transfer section or deck 130B. The single-ended picking structure may be used in, for example, a building or other structure having loading docks disposed only on one side of the building. In this example, the storage and retrieval system 200 includes transfer deck (s) 130B and picking aisles 130A that allow bots 110 to traverse an entirety of a level of the storage structure 130 on which that bot 110 is located for transporting items between any suitable storage locations/picking aisles 130A and any suitable multilevel vertical conveyors 150A, 150B. The multilevel vertical conveyors 150A, 150B provide transport of case units into the storage and retrieval system 200 through input workstations 210 and provide output of case units from the storage and retrieval system 200 through output workstations 220. In the embodiments, the storage and retrieval system 200 includes a first and second storage section 230A, 230B located side by side so that the picking aisles of each section are substantially parallel with each other and facing the same direction (e.g. towards transfer deck 130B). However, in the embodiments the storage and retrieval system may have any suitable number of storage sections arranged relative to each other in any suitable configuration.

Figure 3A:
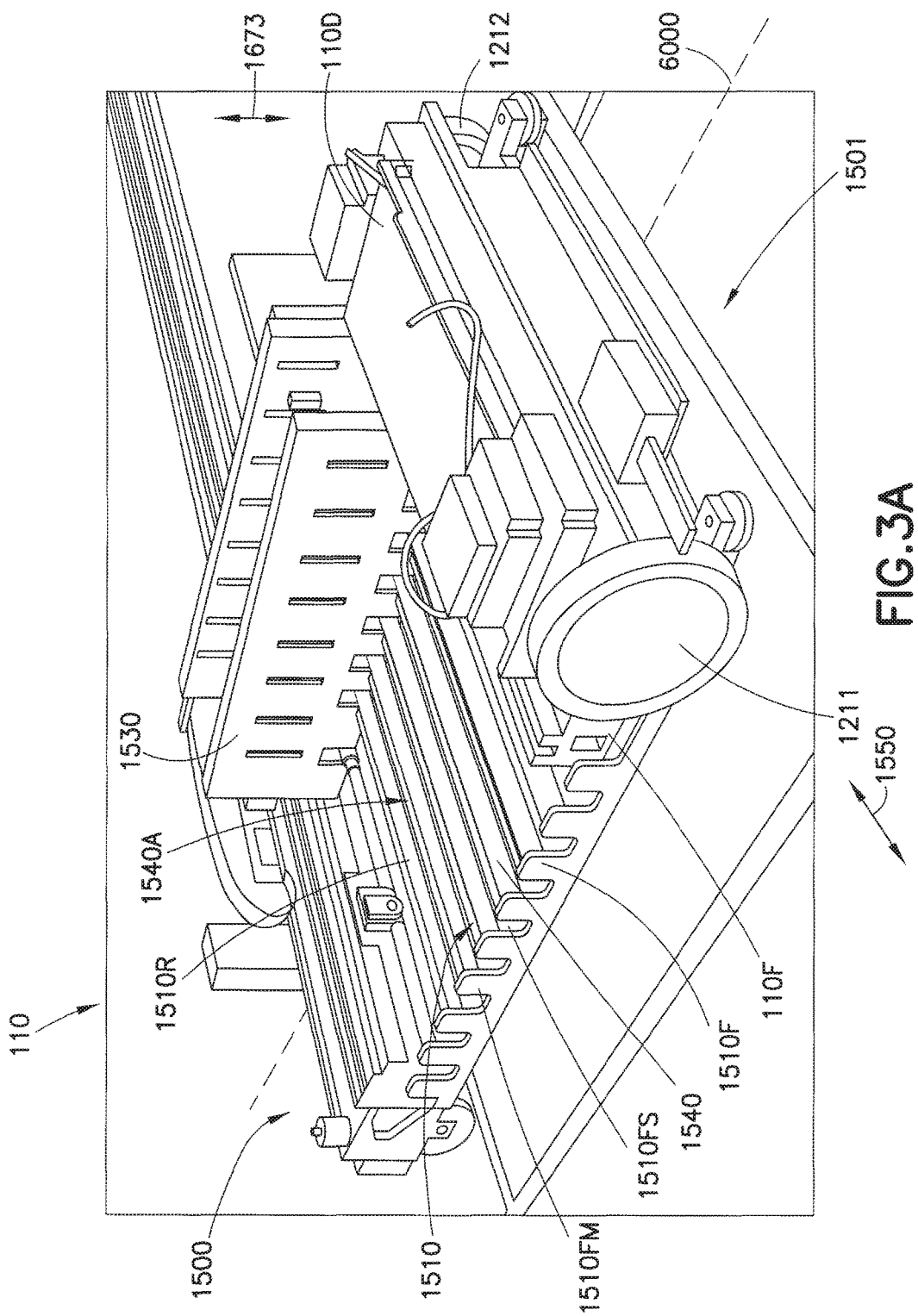
FIGS. 3A and 3B are schematic illustrations of an exemplary autonomous transport vehicle in accordance with the embodiments.
Figure 3B:
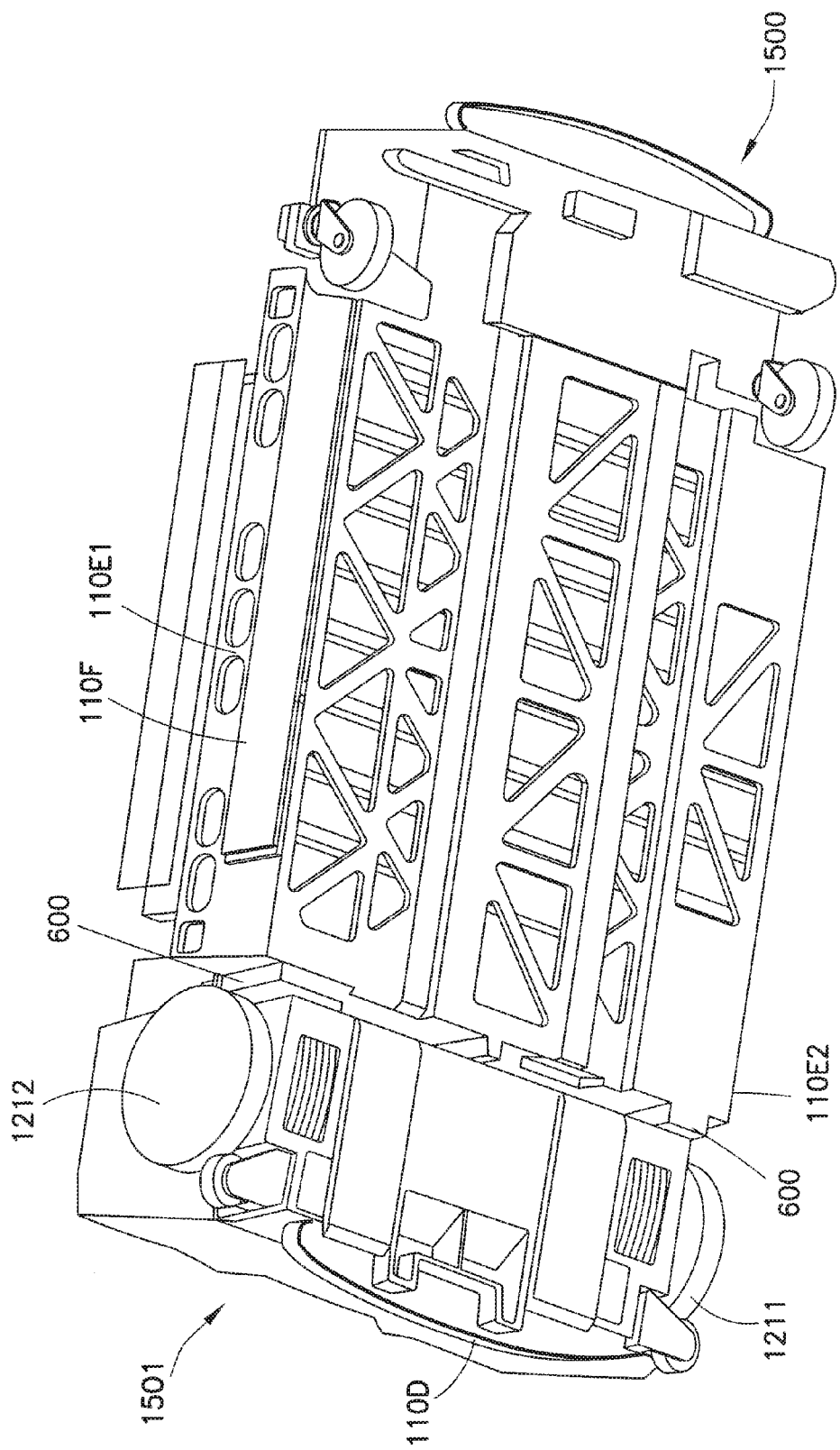
Figure 4:
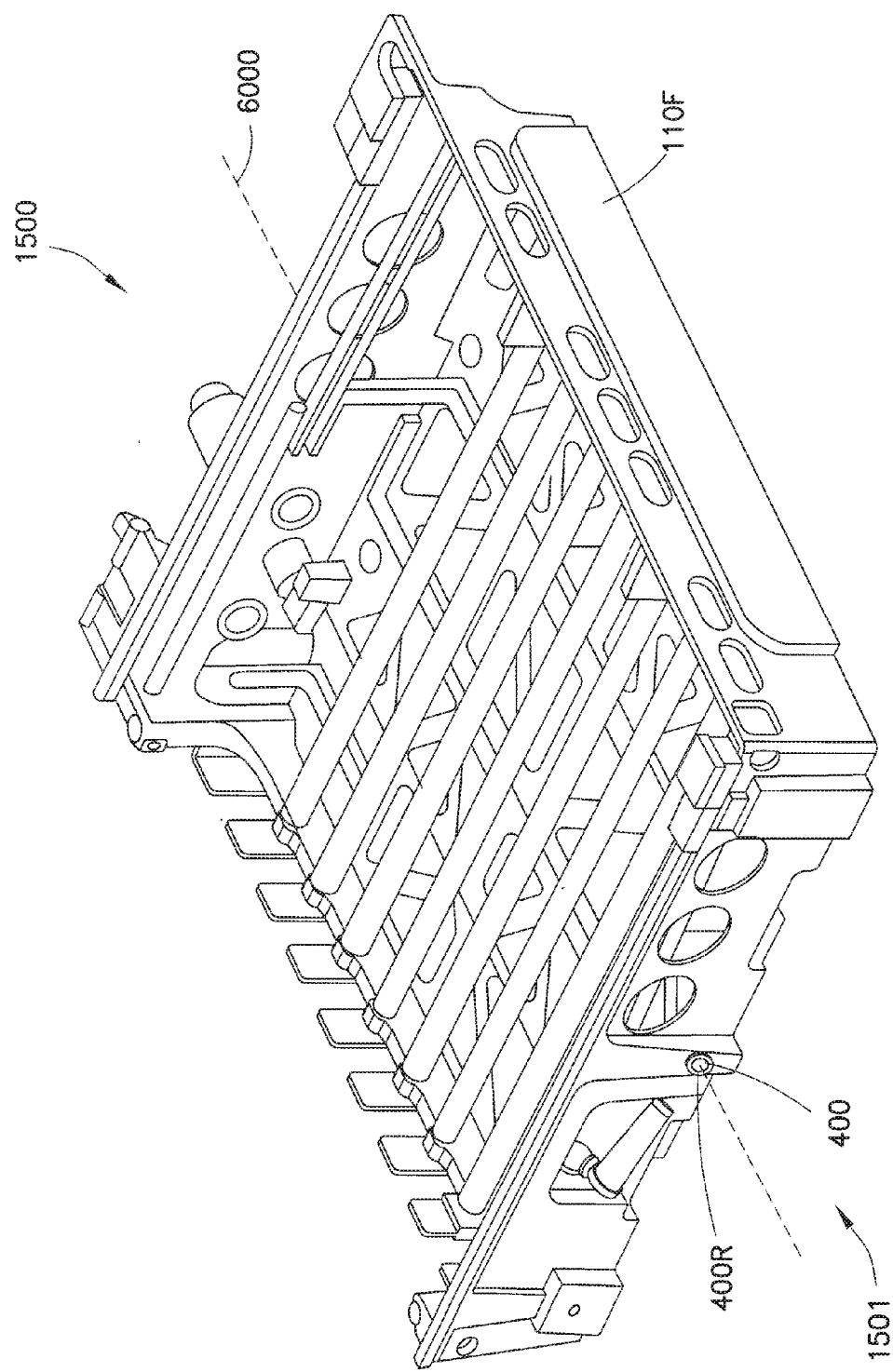
FIG. 4 is an schematic illustration of a portion of the autonomous transport vehicle of FIG. 3 in accordance with the embodiments.

Referring to FIGS. 3A and 3B an exemplary bot 110 is shown. In the embodiments the bot 110 includes a longitudinally extended frame 110F that has a first end 1500 and a second end 1501 where the longitudinal axis (e.g. Y-axis) 6000 extends from the first end 1500 to the second end 1501. At least one drive section 110D may be coupled to one of the first and/or second ends 1500, 1501 in any suitable manner for driving the bot 110 along the transfer deck(s) 130B and picking aisles 130A (FIG. 1). The drive 110D may include drive wheels, tracks or any other suitable drive mechanism for effecting travel of the bot along the transfer deck(s) 130B and picking aisles 130A. The other end 1500, 1501 of the bot 110 may have any suitable supports, such as caster wheels, fixed wheels, steerable wheels, and similar mechanisms for movably supporting the bot 110 as it travels along the transfer deck(s) 130B and picking aisles 130A. The bot 110 may have any suitable controller 1220 (FIG. 1) for effecting operation of the bot 110 and/or communication between the bot 110 and the control server 120 (FIG. 1). As may be realized the configuration of the bot shown in the drawings is merely exemplary and the bot may have any suitable configuration for carrying out the detection and positioning of case units relative to the bot 110 as described herein.

The frame 110F of the bot 110 may form a payload bed 1510 or other suitable holding structure that is configured to hold case units or any other suitable payload. The payload bed 1510 may be suitably sized for accepting (e.g. holding) any case unit (or pickface where a pickface is one or more case units that is/are to be picked and carried by the bot 110) that may be transferred into or removed from the storage and retrieval system 100. For example, in the embodiments the payload bed 1510 may be larger than an expected pick size (i.e. larger than the pickface the bot is expected to pick from, for example, a storage shelf of a storage section 230A, 230B or any other suitable component of the storage and retrieval system such as the multilevel vertical conveyors).

A fence 1510F or other suitable retaining device may be located at a side opening of the payload bed 1510. In one exemplary embodiment the fence 1510F may be attached to the frame 110F in any suitable manner such as with fasteners or welding. In the embodiments the fence 1510F may also form part of the frame 110F or be of unitary construction with the frame 110F. The fence may include slots 1510FS disposed between stopping members 1510FM. The slots 1510FS may be configured to allow the fingers 1540 of the bot arm 1540A to extend through the fence 1510F in a substantially lowered position so that the fingers 1540 can be, for example, extended into a storage shelf below a case unit. The fence 1510F may be configured to extend above the payload bed 1510 to form a barrier that substantially prevents case units from exiting the payload bed 1510 once the case units are positioned on the payload bed 1510. In this example, the number of slots 1510FS is equal to the number of fingers 1540 but in alternate embodiments, the fence 1510F may be configured such that more than one finger 1540 passes through a single slot (e.g. the number of slots is less than the number of fingers). It should be noted that the fence may have any suitable configuration for preventing case units from exiting the payload area when the case units are carried by the bot 110. For example, the fence may be movable so that the stopping members are retractable such that when in an extended configuration the fence prevents the case units from exiting the payload area.

The payload bed 1510 may include any suitable payload supports for supporting the case units when the case units are carried by the bot 110. For exemplary purposes only, the payload supports may include rollers 1510R, where a rotational axis of each roller 1510R is disposed substantially transversely (or laterally) to the longitudinal axis 6000 of the bot 110. It is noted that the payload supports may also be belts, ball bearings or any other suitable supports. The rollers 1510R (or other suitable payload supports) may be interdisposed with fingers 1540 of the bot 110 in an alternating manner. In the embodiments the rollers 1510R and the fingers 1540 may be arranged relative to each other in any suitable manner. In one example, the payload supports may be driven in any suitable manner for justifying the payload in the payload area as described in, for example, United States Provisional Patent Application entitled "BOT PAYLOAD ALIGNMENT AND SENSING" with (Ser. No. 61/423,220) and filed on Dec. 15, 2010 (now U.S. patent application Ser. No. 13/327,040 filed on Dec. 15, 2011), the disclosures of which are incorporated by reference herein in their entireties.

The fingers 1540 of the bot arm 1540A extend laterally in the direction of arrow 1550 relative to the longitudinal axis 6000 of the bot. The fingers 1540 are also capable of movement in the direction of arrow 1673 (e.g. in a direction substantially perpendicular to the direction 1550 of extension and retraction of the fingers). The fingers may be driven by any suitable drive for lifting the pickfaces over the fence 1510F and into/out of the payload bed 1510 of the bot 110.

Figure 7A:
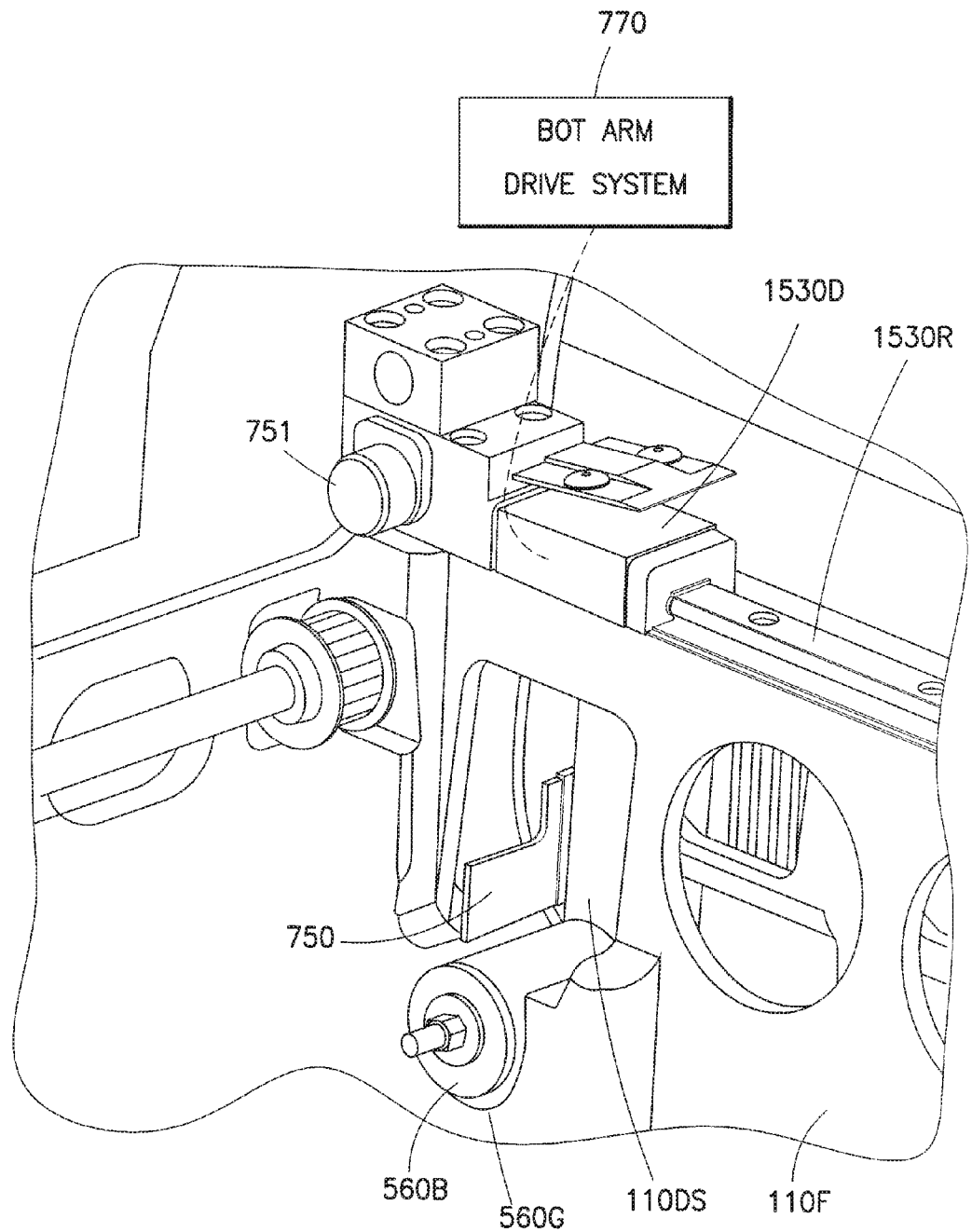
FIGS. 7A and 7B are schematic illustrations of a portion the exemplary autonomous transport vehicle of FIG. 3 in accordance with the embodiments.
Figure 7B:
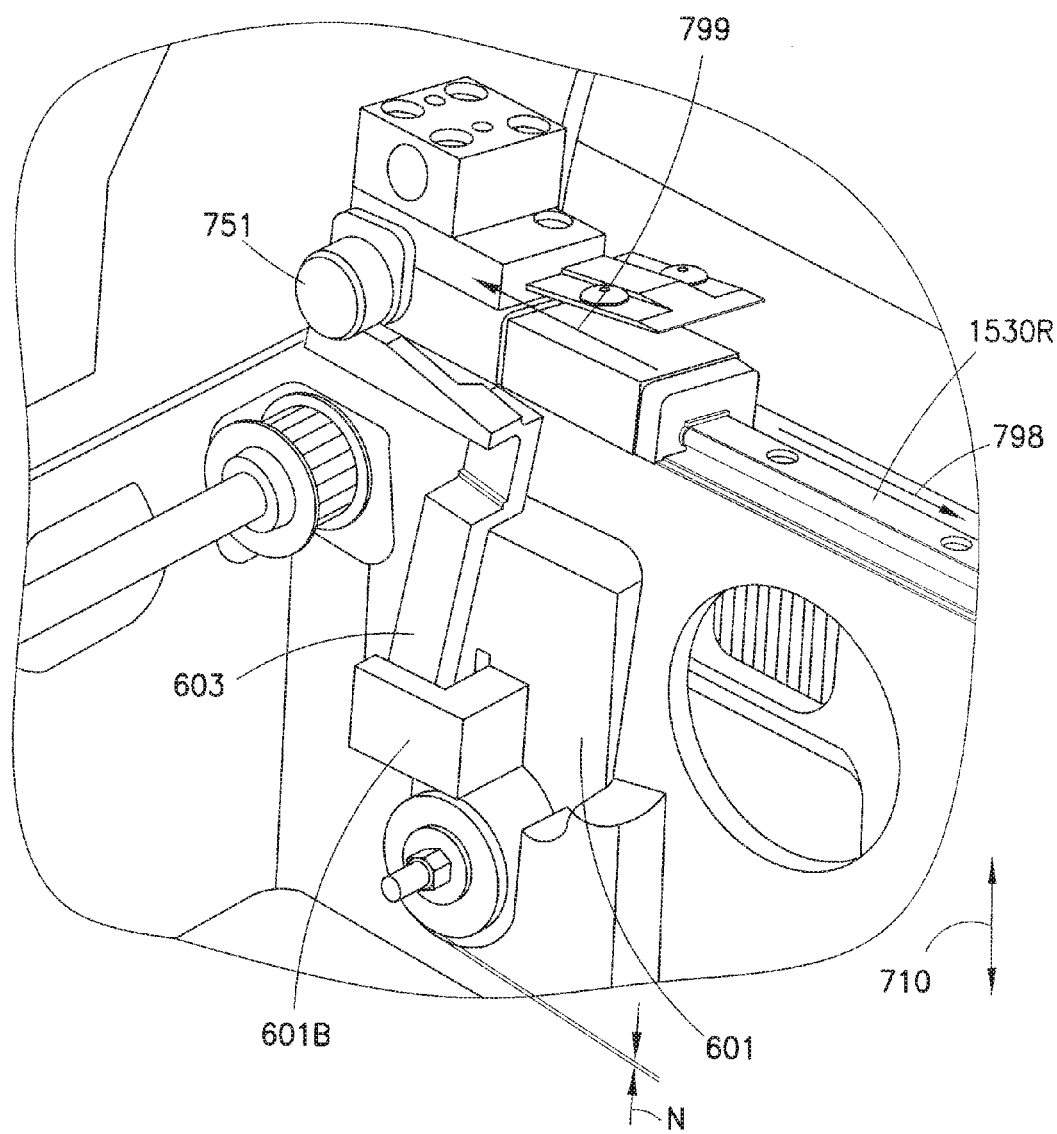

A case unit contact member 1530 may be movably located at least partially within the payload area. The case unit contact member 1530 may be driven laterally in the direction of arrow 1550 by any suitable drive. In this exemplary embodiment both of the case unit contact member 1530 and the fingers 1540 are configured to move laterally in the direction of arrow 1550. The case unit contact member 1530 may be configured to move along rails 1530R (FIGS. 7A and 7B). The rails may be mounted to the frame 110F in any suitable manner for guiding the movement of at least the case unit contact member 1530. In the embodiments the movement of the case unit contact member 1530 may be guided in any suitable manner. For exemplary purposes only, referring to FIGS. 7A and 7B, the case unit contact member 1530 may have slide members 1530D for movably coupling the case unit contact member 1530 to the rails 1530R. In the embodiments the case unit contact member 1530 may be movable independent of the fingers 1540 in the direction of arrow 1550 for engaging case units disposed on the payload bed 1510. The fingers 1540 may be releasably coupled to the case unit contact member 1530 in any suitable manner such that the fingers 1540 are extended using the case unit contact member drive system. Suitable examples of the bot transfer arm, fingers and transfer arm drive system can be found in United States Provisional Patent Application entitled "AUTOMATED BOT TRANSFER ARM DRIVE SYSTEM," having (Ser. No. 61/423,388) and filed on Dec. 15, 2010 (now U.S. patent application Ser. No. 13/326,993 filed Dec. 15, 2011) and United States Provisional Patent Application entitled "AUTOMATED BOT WITH TRANSFER ARM" with (Ser. No. 61/423,365) and filed on Dec. 15, 2010 (now U.S. patent application Ser. No. 13/326,952 filed Dec. 15, 2011), previously incorporated by reference.

Still referring to FIGS. 3A and 3B and also to FIGS. 4, 5, 5A and 5B, the at least one drive section 110D may be connected to the frame in any suitable manner. In one aspect the drive section 110D may be connected to the frame by any suitable movable coupling system. In the embodiments the movable coupling system may be a suspension system that may pivotally (or otherwise movably) couple the drive section 110D to the frame 110F in any suitable manner to allow for relative rotation between the at least one drive section 110D and the frame 110F. It should be noted that while a pivotal coupling is shown and described that in other aspects the coupling may be, for exemplary purposes only, any suitable articulated coupling including but not limited to linearly movable couplings, rotatable couplings or a combination thereof. As may be realized, the bot may be supported at four points (e.g. one wheel 1261, 1262, 1211, 1212 being located at substantially each corner of the bot). If all four support wheels were rigidly connected to the frame 110F and the bot were to travel over bumps or other raised/uneven structures on, for example, the travel surface of the transfer decks 130B and/or picking aisles 130A one or more wheels of the bot may be lifted off of the travel surface causing, for example, a loss of wheel traction. As may also be realized, a position of the bot within the storage and retrieval system 100 may be determined at least in part with any suitable wheel odometry system, as described in e.g. U.S. patent application Ser. No. 13/327,035 filed on Dec. 15, 2011 entitled "BOT POSITION SENSING" the disclosure of which was previously incorporated herein by reference, such that a loss of wheel traction may cause an incorrect odometry reading. The movable connection between the at least one drive section 110D and the frame 110F may substantially prevent the drive wheels 1211, 1212 from lifting off of the travel surface such that accurate bot positioning can be determined.

In the embodiments, the frame 110F may include a pivot or articulation member 400. The pivot member 400 may be located substantially in line with the longitudinal axis 6000 of the bot 110 such that the weight of the bot (and any payload thereon) may be centrally supported at the end 1501 of the bot 110. It is noted that the pivot member 400 may be suitably located at any location on the end 1501 of the bot frame 110F. The pivot member may be integrally formed with the frame 110F or affixed to the frame in any suitable manner. In this example the pivot member 400 may include any suitable recess or aperture 400R configured to accept a corresponding pivot axle 500 of the at least one drive section 110D.

The at least one drive section 110D may include a pivot axle 500 configured to be received within the recess 400R of the pivot member 400 or the frame 110F may include the pivot axle and the drive section 110D may include the pivot member. As may be realized, in the embodiments the frame and drive section may have any suitable structure for allowing the drive section to pivot relative to the frame. In this example, the pivot axle 500 may be pivotally retained within the pivot member 400 in any suitable manner such as by clips, bolts, snaps or any other suitable retention devices. The pivot axle 500 and pivot member 400 may be configured such that the drive section 110D pivots axially in the direction of arrow 550 with respect to the longitudinal axis 6000 of the frame 100F. The connection between the drive section 110D and the frame 110F may also be configured to allow drive section 110D and the frame 110F to pivot relative to each other in any suitable direction(s).

In the embodiments the drive section 110D may include one or more guide members 530. The guide members 530 may be wheels, sliders or any other suitable structure that, for example, engages a surface 535 of the frame 110F when the drive section 110D and the frame 110F are coupled to each other through the pivotal coupling 510 (e.g. formed by pivot axle 500 and pivot member 400). The frame 110F may also include the guide members 530 such that the guide members engage a surface of the drive section 110D when the frame 110F and drive section 110D are movably coupled to each other. In this example the guide members 530 may be mounted to the drive section 110D so that the guide members 530 allow the relative pivotal (or otherwise) movement between the drive section 110D and the frame 110F while in part substantially maintaining a substantially rigid longitudinal axis of the bot 110. For example, in the embodiments the guide members 530 are laterally spaced (e.g. along the X-axis) from the pivot axis 510P of the pivotal coupling 510 by any suitable distance X1, X2. The distance X1, X2 between the pivot axis 510P and the guide members 530 may substantially prevent (through contact between the guide members 530 and the surface 535 of the frame) yawing motion (e.g. in the direction of arrow 598 in the X-Y plane) between the drive section 110D and the frame 110F. At least one of the guide members 530 may also be vertically spaced (e.g. along the Z-axis) from the pivot axis 510P by any suitable distance Z1, Z2. The distance Z1, Z2 between the pivot axis 510P and the at least one of the guide members 530 may substantially prevent (through contact between the one of the guide members 530 and the surface 535 of the frame) pitching motion (e.g. in the direction of arrow 599 in the Y-Z plane) between the drive section 110D and the frame 110F. In this example, the guide members 530A-530D may be located substantially at corners of an interface surface 110DS of the drive section 110D such that two guide members 530A, 530B are vertically spaced above the pivot axis 510P by a distance Z1 and two guide members 530C, 530D are vertically spaced below the pivot axis 510P by distance Z2. Alternatively, it is noted that all of the guide members 530A-530D may be located above the pivot axis or below the pivot axis. The guide members 530A, 530D may be laterally spaced from the pivot axis (on a first side of the pivot axis) by distance X1 and guide members 530B, 530C may be laterally spaced from the pivot axis (on a second opposite side of the pivot axis) by distance X2. In the embodiments there may be any suitable number of guide members arranged (e.g. spaced from the pivot axis) to prevent yawing and pitching motion between the drive section 110D and the frame 110F.

In the embodiments the axial stability (e.g. in yaw and pitch) of the coupled drive section 110 and frame 110F may be provided through one or more of the guide members 530A-530D and the connection between the pivot member 400 and pivot axle 500. For example, in one exemplary embodiment the pivot axle 500 may be axially secured within the pivot member 400 so that the guide members 530A-530D are held substantially against the surface 535 of the frame. One or more of the guide wheels 530, the pivot axle 500 and pivot member 400 may also be adjustable in the longitudinal or X-direction to take up or substantially eliminate any relative movement in the X-Y and Y-Z (e.g. yaw and pitch) planes between the drive section 110D and the frame 110F. It is noted that the guide wheels may be held against the surface 535 of the frame 110 in any suitable manner for providing a substantially rigid longitudinal coupling between the drive section 110D and the frame 110F. As may be realized, the guide members 530 and/or the pivotal coupling 510 may only allow relative rotation (e.g. roll) between the drive section 110D and the frame 110F in the direction of arrow 550 in the X-Z plane. In other aspects the coupling between the drive section and frame may allow any suitable relative movement between drive section and the frame.

Figure 5:
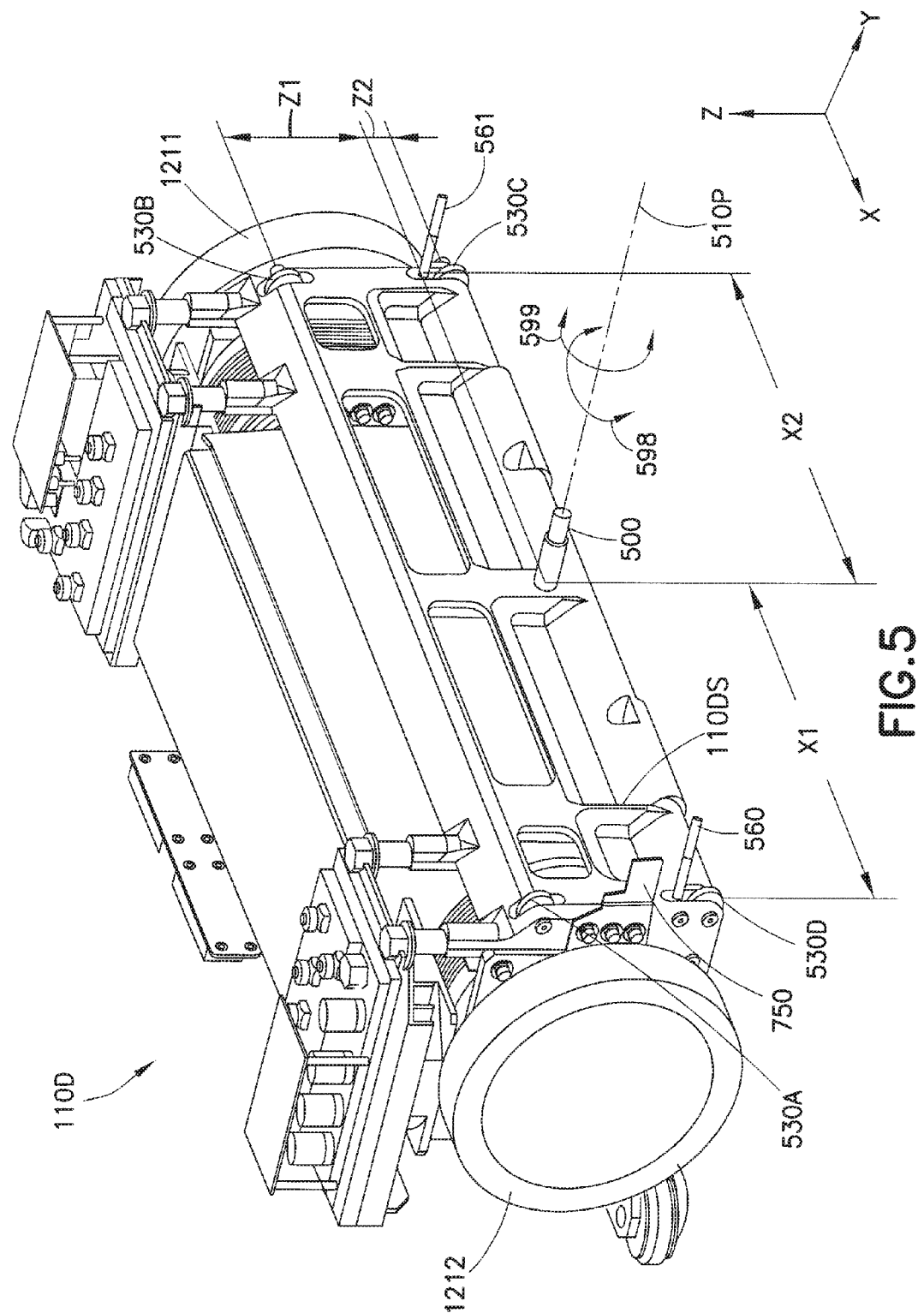
FIG. 5 is an schematic illustration of a portion of the autonomous transport vehicle of FIG. 3 in accordance with the embodiments.
Figure 6B:
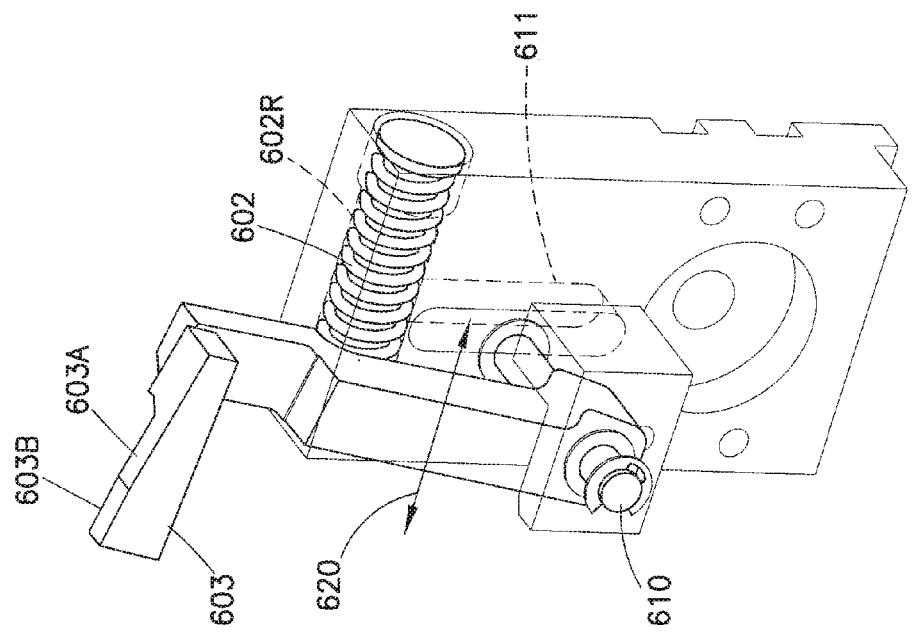
Figure 6A:
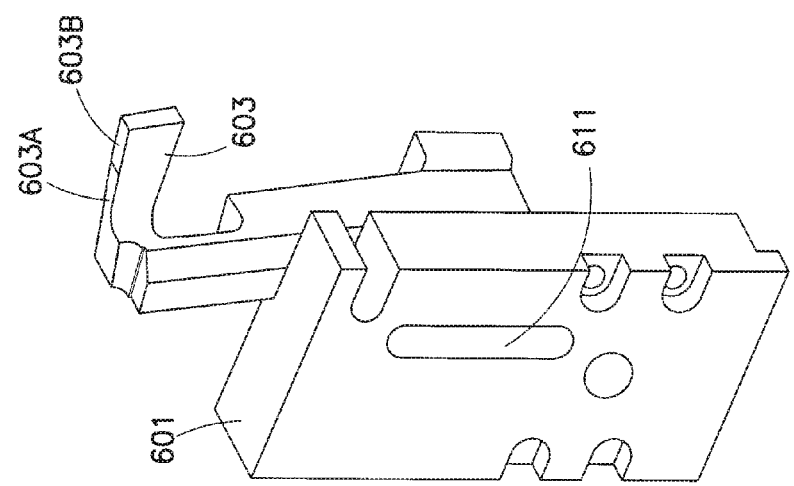

As may be realized the rotation or pivoting between the drive section 110D and the frame 110F in the direction of arrow 550 (in the X-Z plane) may be limited in any suitable manner. Referring to FIGS. 5, 7A and 7B in one exemplary embodiment, protruding members 560, 561 may extend from interface surface 110DS of the drive section 110D. In this example, the protruding members 560, 561 are located at opposite lateral ends of the drive section 110D but the protruding members may be located at any suitable position for limiting pivotal travel between the drive section 110D and the frame 110F. The protruding members 560, 561 may be any suitable members configured to engage, for example, a recess or groove 560G such as, for example, pins, bushings, threaded rods, studs, etc. It is noted that while the protruding members 560, 561 are described with respect to protruding member 560 the protruding member 561 is substantially similar to protruding member 560. In this example the protruding member 560 may be a stud or pin. A suitable bushing 560B may be connected to the protruding member 560. In one example, the protruding member 560 and the bushing 560B may be integrally formed with each other. In another example, the bushing 560B may be fixed to the protruding member 560 by mechanical or chemical fasteners, by an interference fit between the two or in any other suitable manner. In the embodiments the bushing 560B may be configured to substantially cushion the pivoting travel of the drive section 110D as the drive section 110D reaches its travel limits. Alternatively the bushing may provide a substantially hard stop for the pivoting drive section 110D. The travel limits of the drive section 110D may be effected by recesses or grooves 560G formed in the frame 110F that correspond to each of the protruding members 560, 561. The bushing 560B for each of the protruding members 560, 561 and the corresponding grooves 560B may be configured such that when the bot 110 is on a substantially level surface the bushing 560B is spaced from an end of the corresponding groove 560B by any suitable predetermined distance N. The bushings 560B and grooves 560G may be sized such that the bushing moves substantially in the direction of arrow 710 within the groove 560G during pivoting movement of the drive section 110D substantially without interference. Contact between the bushing 560B and the end of the groove 560G limits the travel (e.g. pivotal movement) between the drive section 110D and the frame 110F.

Referring to FIGS. 3B, 6A, 6B, 6C, 6D, 7A and 7B the relative pivotal movement between the drive section 110D and the frame 110F may allow movement between the frame 110F and the drive section 110D as the bot arm 1540A (FIG. 3A) is extended laterally to pick/place a pickface from one of the storage shelves of the storage sections 230A, 230B or multilevel vertical conveyors 150A, 150B. The bot 110 may include a locking system or lockout mechanism having one or more locking devices 600 configured to passively lock out the bot suspension for substantially preventing relative movement between the drive section 110D and frame 110F as the bot arm 1540A is extended laterally or in any other suitable direction (e.g. extension of the bot arm 1540A passively causes a locking of the suspension). Though the embodiments are described with respect to the passive locking of the suspension when the arm is extended, in other aspects the locking devices 600 may be configured to actively lock the suspension in any suitable manner independent of the arm position. The locking device 600 may be located any suitable predetermined distance from the pivot axis 510P. In one example one or more locking devices 600 may be located substantially at or adjacent a respective side edge 110E1, 110E2 of the frame 110F. While a locking device 600 is shown adjacent each of the edges 110E1, 110E2, a single locking device may be located along only one of the edges 110A1, 110E2. Still any suitable number of locking devices 600 may be located at any suitable location(s) relative to, for example, the pivot axis 510P.

In this example, the locking device 600 may include a body 601, a resilient member 602 and a lever member 603. The body may have any suitable configuration and is shown in the Figs. as having a substantially rectangular shape for exemplary purposes only. In this example the body may be configured for attachment to the frame 110F but, the body may also be configured for attachment to the drive section 110D. The body 601 may include a recess 602R suitably sized so that the resilient member 602 may be inserted into the recess 602R. In this example, the resilient member 602 may be an extension spring but in alternate embodiments the resilient member 602 may be any suitable resilient member such as a leaf spring, compression spring or torsion spring and the body 601 may be suitably configured for interfacing with or housing the resilient member in any suitable manner. The lever member 603 may be pivotally mounted to the body 601 in any suitable manner such as through, for exemplary purposes only, a pivot pin 610. The lever member 603 may have a compound surface having a first surface 603A and a second surface 603B that engages a cam 751 as described below and a surface 603E that engages an engagement member 750 as will also be described below. The body 601 may be configured so that the lever member 603 pivots in the direction of arrow 620 which may be substantially parallel with the interface surfaces 535, 110DS of the frame 110F and drive section 110D when the body is mounted to, for example, the frame 110F. The resilient member 602 may be positioned relative to the lever member 603 and/or the lever member 602 may be configured such that the resilient member 602 engages the lever member 603 for rotating the lever member 603 in the direction of arrow 798 towards an aperture 611 formed in the body 601 so that the locking device 600 is biased in a suspension locked position (e.g. in the direction of arrow 798) when the arm is extended and retraction of the arm acts against the force provided by the resilient member 602 for locking the suspension so that the arm moves in the direction of arrow 799.

The locking system may also include an engagement member 750 corresponding to each of the locking devices 600. The engagement member 750 may be configured for attachment to, for example, the drive section 110D such that the engagement member 750 extends from the interface surface 110DS. The engagement member 750 may be positioned so that it extends through the aperture 611 in the body for interfacing with the surface 603E of the lever member 603. The engagement member 750 and/or the aperture 611 may be configured to allow movement of the engagement member 750 within the aperture 611 as the drive section 110D and frame 110F pivot relative to one another.

One or more cams or idlers 751 may be rotatably mounted to the frame 110F. Each cam 751 may be positioned at any suitable location of the frame 110F for interfacing with, for example, surfaces 603A, 603B (or any other suitable surface) of a respective one of the lever members 603 of the one or more locking devices 600. For example, the cam 751 may move with, for example, a respective one of the slide members 1530D as the bot arm 1540A is extended and retracted. As the bot arm 1540A is extended the cam 751 moves in the direction of arrow 798 moving from surface 603B to surface 603A and eventually off of the lever 603 allowing the lever member to pivot in the direction of arrow 798 towards the aperture 611 for locking the suspension of the bot 110. As may be realized the force exerted on the lever member 603 by the resilient member 602 may hold the lever member against the surface of the cam 751 so that as the cam 751 moves the lever member is moved towards and away from the aperture 611 for locking and releasing the suspension of the bot 110. When the bot arm 1540A is retracted the cam 751 moves in the direction of arrow 799 so that the cam 751 engages the surface 603A and then the surface 603B of the lever 603 causing the lever to pivot in the direction of arrow 799 for releasing the suspension of the bot 110. As seen best in FIG. 6D, when the cam 751 is engaged with the surface 603B of the lever, the surface 603B of the lever member 603 is oriented in such a way so that the cam 751 remains substantially in place substantially without any outside influence (such as from motors or clips) due to, for example, the normal force between the cam 751 and the surface 603B provided by the resilient member 602, which is overcome when the bot arm is extended. In alternate embodiments, the cam 751 may be stationary (e.g. does not move with, for example, the slide members 1530D) and driven by any suitable drive system such that the driven rotation of the cam causes the pivoting movement of the lever 603 for locking and unlocking the bot suspension.

As described above, the engagement member 750 extends through the aperture for interfacing with the lever member 603. As movement of the cam 751 in the direction of arrow 798 allows movement of the lever member 603 in the direction of arrow 798, the surface 603E of the lever member 603 contacts the engagement member 750 and pinches or clamps the engagement member 750 against any suitable surface of the body 601. For example, the engagement member 750 may extend into a block member 601B of the body 601 such that at least a portion of the engagement member 750 is located between a surface of the block member 601B and the lever member 603 (e.g. the engagement member is pinched or clamped between the lever member and the surface of the block as the cam is rotated). The pinching or clamping force exerted on the engagement member 750 may be a predetermined force sufficient to substantially rigidly hold the drive section 110D in a predetermined position relative to the frame 110F (e.g. substantially prevent relative pivoting between the frame and drive section such that the drive section and frame form a single substantially stiff structure) as the bot arm 1540A is laterally extended to, for example, transfer pickfaces between the bot 110 and a storage shelf or multilevel vertical conveyor.

In the embodiments, the one or more cams 751 may be suitably connected to any suitable bot arm drive system 770 for passively locking the suspension of the bot 110. For example, the connection between the one or more cams 751 and the bot arm drive system 770 may cause operation of the locking device 600 as the bot arm 1540A is extended for passively/automatically locking the suspension of the bot. The cam 751 may also be driven by an independently operable drive system so that the bot suspension can be actively locked/unlocked independent of the bot arm position. In the embodiments, when the bot arm 1540A is in a predetermined retracted or homed position the locking device 600 is automatically released and the drive section 110D and frame 110F are allowed to pivot (or otherwise move) relative to one another. For example, during operation of the bot 110, the bot 110 may traverse the picking aisles 130A and transfer deck 130B with the bot arm 1540A in a homed (e.g. retracted) position. With the bot arm 1540A in the homed position the bot suspension is unlocked and the drive section 110D and frame 110F are free to pivot relative to one another allowing the suspension to conform to the travel surfaces of the picking aisles 130A and transfer deck 130B. As the bot arm 1540A is extended the cam 751 is passively moved (by virtue of its connection to the bot arm drive system 770) for allowing the lever member 603 to move in the direction of arrow 798 for pinching or clamping the engagement member 750 and passively locking the bot suspension so that the drive section 110D and frame 110F form a single substantially rigid or stiff structure substantially eliminating any rotation or tipping of the frame 110F that may cause the extended arm 1540A to tip relative to a surface on which a pickface is located or being transferred to. As the bot arm 1540 is retracted to the home position the cam 751 is passively moved for moving the lever member 603 in the direction of arrow 799 for releasing the engagement member 750 and passively unlocking the bot suspension. It is noted that the cam may be passively or actively driven in any suitable manner for causing operation of the locking device.

In a first exemplary embodiment an autonomous transport robot for transporting a payload is provided. The autonomous transport robot includes a drive section assembly having at least one motor and a pair of drive wheels coupled to the motor, a frame configured to support a payload, a transfer arm connected to the frame and configured for an autonomous transfer of payload to and from the frame, and a suspension system movably connecting the drive section assembly and the frame allowing relative movement between the frame and the drive section assembly.

In accordance with the first exemplary embodiment, the suspension lockout device is configured such that the suspension is free to move when the transfer arm is in a retracted position.

In accordance with the first exemplary embodiment, the suspension is configured to maintain drive wheels of the drive section in substantial contact with a travel surface on which the autonomous transport vehicle is travelling.

In accordance with a first aspect of the first exemplary embodiment the suspension system includes a pivot member mounted to one of the frame and drive section and a pivot axle mounted to the other one of the frame and drive section, where the pivot axle and pivot member are configured to engage each other to form a pivot coupling between the frame and drive section.

In accordance with the first aspect of the first exemplary embodiment one or more guide members are connected to one of the frame and drive section, the guide members being configured to engage an interface surface of the other one of the frame and drive section and at least in part to substantially prevent relative yaw and pitch between the frame and drive section.

In accordance with a second aspect of the first exemplary embodiment the autonomous transport robot further includes a suspension lockout device connected to one or more of the frame and drive section. The suspension lockout device being configured to passively lock the suspension system as the transfer arm is extended from the frame where locking of the suspension system substantially prevents relative pivoting movement between the drive section and the frame.

In accordance with the second aspect of the first exemplary embodiment the lockout device includes an engagement member mounted to one of the frame and drive section, a locking device mounted to the other one of the frame and drive section and an actuation member configured to actuate the locking device causing the locking device to engage the engagement member.

In accordance with the second aspect of the first exemplary embodiment the lockout device includes a body and a lever member pivotally mounted to the body, wherein the engagement member extends between the body and lever member and the body and lever member are configured such that actuation of the locking device causes the engagement member to be clamped between the lever member and body.

In accordance with the second aspect of the first exemplary embodiment the lockout device includes a resilient member configured to move the lever member away from the engagement member for at least in part unlocking the suspension.

In accordance with the second aspect of the first exemplary embodiment the actuation member comprises a cam connected to a drive system of the transfer arm, wherein the cam is configured to be passively rotated during extension of the transfer arm.

In accordance with a second exemplary embodiment a suspension lockout system for an autonomous transport vehicle is provided. The suspension lockout system includes an engagement member mounted to one of a frame and drive section assembly of the autonomous transport vehicle, where the frame is configured to support a payload and the drive section assembly includes at least one motor and a pair of drive wheels coupled to the motor, and a locking device mounted to another one of the frame and drive section assembly of the autonomous transport vehicle, wherein a suspension system of the autonomous transport vehicle connecting the frame to the drive section assembly is configured to allow pivotal movement between the frame and drive section assembly and the suspension lockout system is configured to release the suspension system for unrestricted movement between the frame and drive section assembly when the transfer arm is in a retracted position and to be automatically locked when the transfer arm is extended from the retracted position, and wherein locking of the suspension lockout system substantially prevents pivotal movement between the frame and drive section.

In accordance with a first aspect of the second exemplary embodiment the suspension lockout system the locking device includes a body and a lever member pivotally mounted to the body, wherein the engagement member extends between the body and lever member and the body and lever member are configured such that actuation of the locking device causes the engagement member to be clamped between the lever member and body.

In accordance with the first aspect of the second exemplary embodiment the suspension lockout system further includes a cam connected to the transport arm drive system, wherein the cam is configured to be passively rotated during extension of the transfer arm and to engage the lever member for causing clamping of the engagement member.

In accordance with the second exemplary embodiment the locking device includes a resilient member configured to move the lever member away from the engagement member for at least in part unlocking the suspension.

In accordance with a third exemplary embodiment a suspension system for an autonomous transport vehicle is provided. The suspension system includes an articulated coupling configured to allow rolling movement between a frame and a drive section assembly of the autonomous transport vehicle along a common longitudinal axis where the frame is configured to support a payload and the drive section assembly includes at least one motor and a pair of drive wheels coupled to the motor, and a suspension locking system configured to automatically substantially prevent the rolling movement when an extendable transfer arm is moved from a retracted position, where the extendable transfer arm is configured to move between the retracted position and an extended position relative to the frame.

In accordance with the third exemplary embodiment the suspension locking system is configured to automatically release the articulated coupling to allow the rolling movement when the arm is moved to the retracted position.

In accordance with the third exemplary embodiment the suspension system is configured to maintain drive wheels of the drive section assembly in substantially continuous contact with a travel surface on which the autonomous transport vehicle is travelling.

In accordance with the third exemplary embodiment the suspension system further includes one or more guide members mounted to one of the frame and drive section assembly at an interface between the frame and guide section, the one or more guide members being configured to substantially prevent yaw and pitch motion between the frame and drive section.

In accordance with a first aspect of the third exemplary embodiment the suspension locking system includes an engagement member mounted to one of the frame and drive section assembly, a body mounted to another one of the frame and drive section and a lever member pivotally mounted to the body, wherein the engagement member extends between the body and lever member and the body and lever member are configured such that actuation of the suspension locking system causes the engagement member to be clamped between the lever member and body.

In accordance with the first aspect of the third exemplary embodiment the suspension locking system includes a resilient member configured to move the lever member away from the engagement member for at least in part unlocking the articulated coupling.

In accordance with the first aspect of the third exemplary embodiment the suspension locking system further includes a cam configured to engage the lever member for actuating the suspension locking system, wherein the cam is passively connected to a drive system of the extendable transfer arm.

It should be understood that the exemplary embodiments disclosed herein can be used individually or in any suitable combination thereof. It should also be understood that the foregoing description is only illustrative of the embodiments. Various alternatives and modifications can be devised by those skilled in the art without departing from the embodiments. Accordingly, the present embodiments are intended to embrace all such alternatives, modifications and variances that fall within the scope of the appended claims.

What is claimed is:

1. An automated storage and retrieval system comprising:
    a storage array with storage locations arranged along a transport surface; and
    an autonomous transport vehicle for transporting, on the transport surface, a payload between the storage locations of the storage array, the autonomous transport vehicle comprising
        a frame having at least four corners and at least four support wheels, the four support wheels being distributed at least proximate the at least four corners of the frame, to support the frame on and to contact the transport surface on which the autonomous transport vehicle travels, where the frame defines a payload support section;
        at least one steerable wheel mounted to the frame and configured to contact the transport surface and steer the frame along the transport surface;
        a drive section having at least one motor and at least two support wheels of the at least four support wheels, the at least two support wheels being coupled to the at least one motor;
        a payload justification system configured for at least one degree of freedom payload positioning within the frame; and
        a suspension system pivotally coupling the drive section and the frame allowing relative rotation between the frame and the drive section, wherein the drive section and each of the at least two support wheels of the at least four support wheels are coupled to the frame at one end of the frame, and the at least one steerable wheel is mounted on an opposite end of the frame from the coupling between the drive section and the frame.

2. The automated storage and retrieval system of claim 1, wherein the suspension system of the autonomous transport vehicle includes a locking articulated coupling system having an articulated coupling lockout device.

3. The automated storage and retrieval system of claim 1, wherein the at least two support wheels of the at least four support wheels are disposed on opposite sides of the drive section, the at least two support wheels being drive wheels coupled to the motor.

4. The automated storage and retrieval system of claim 3, wherein the suspension system of the autonomous transport vehicle is configured to maintain the drive wheels of the drive section in substantial contact with the transport surface.

5. The automated storage and retrieval system of claim 1, wherein the suspension system of the autonomous transport vehicle includes a pivot member mounted to one of the frame and the drive section and a pivot axle mounted to the other one of the frame and the drive section, where the pivot axle and pivot member are configured to engage each other to form a pivot coupling between the frame and the drive section.

6. The automated storage and retrieval system of claim 1, wherein the payload justification system of the autonomous transport vehicle is configured for two degree of freedom payload positioning within the frame.

7. A method for transporting a payload within an automated storage and retrieval system with an autonomous transport vehicle, the method comprising:
    providing the autonomous transport vehicle with a drive section, a frame having at least four corners, and at least four support wheels, the at least four support wheels being distributed at least proximate the at least four corners of the frame, to support the frame on and to contact the transport surface on which the autonomous transport vehicle travels, where the frame defines a payload support section and the drive section includes at least one motor and at least two support wheels of the at least four support wheels being coupled to the at least one motor;
    providing at least one steerable wheel on the frame where the at least one steerable wheel contacts the transport surface and steers the frame along the transport surface;
    justifying, with respect to the frame, the payload with a payload justification system having at least one degree of freedom payload positioning; and
    providing a suspension system pivotally coupling the drive section and the frame allowing relative rotation between the frame and the drive section, wherein the drive section and each of the at least two support wheels of the at least four support wheels are coupled to the frame at one end of the frame, and the at least one steerable wheel is mounted on an opposite end of the frame from the coupling between the drive section and the frame.

8. The method of claim 7, where at least two support wheels of the at least four support wheels are drive wheels, the method further comprising maintaining, with the suspension system, substantial contact between the drive wheels and the transport surface on which the autonomous transport vehicle is traveling.

9. The method of claim 7, further comprising:
    providing a suspension lockout device connected to one or more of the frame and drive section; and
    passively locking the suspension system with the suspension lockout device as the payload justification system is extended from the frame, where locking of the suspension system substantially prevents relative pivoting movement between the drive section and the frame.

10. The method of claim 9, wherein the suspension lockout device allows the suspension system freedom of movement when the payload justification system is in a retracted position.

11. The method of claim 9, further comprising:
providing the suspension lockout device with an engagement member mounted to one of the frame and drive section;
providing a locking device mounted to the other one of the frame and the drive section; and
actuating, with an actuation member, the locking device causing the locking device to engage the engagement member.

12. The method of claim 7, where the suspension system is allowing rolling movement between the payload support section and the drive section along a common longitudinal axis and is automatically substantially preventing the rolling movement when the payload justification system is moved from a retracted position, where the payload justification system is configured to move between the retracted position and an extended position relative to the payload support section.

* * * * *